(12) United States Patent
Hasegawa et al.

(10) Patent No.: US 7,237,642 B2
(45) Date of Patent: Jul. 3, 2007

(54) FRAME STRUCTURE OF A VEHICLE

(76) Inventors: Toshiyuki Hasegawa, 18-1, Inadera 2-Chome, Amagasaki-shi, Hyogo (JP) 661-0981; Kazuhiko Ohtsuki, 18-1, Inadera 2-Chome, Amagasaki-shi, Hyogo (JP) 661-0981

( * ) Notice: Subject to any disclaimer, the term of this patent is extended or adjusted under 35 U.S.C. 154(b) by 0 days.

(21) Appl. No.: 11/552,739

(22) Filed: Oct. 25, 2006

(65) Prior Publication Data

US 2007/0062184 A1 Mar. 22, 2007

Related U.S. Application Data

(63) Continuation of application No. 10/767,777, filed on Jan. 30, 2004, now Pat. No. 7,163,077.

(30) Foreign Application Priority Data

Jan. 30, 2003 (JP) .............................. 2003-022272

(51) Int. Cl.
*B60K 17/28* (2006.01)
(52) U.S. Cl. ...................... 180/305; 180/292; 74/15.66
(58) Field of Classification Search ................ 180/292, 180/291, 305, 307, 344, 374, 376; 74/15.63, 74/15.66, 15.69
See application file for complete search history.

(56) References Cited

U.S. PATENT DOCUMENTS 2,296,929 A 9/1942 Ifield (Continued)

FOREIGN PATENT DOCUMENTS

DE 1135774 8/1962

(Continued)

OTHER PUBLICATIONS

Translation of Abstract for JP-8-002267.

(Continued)

*Primary Examiner*—Jeff Restifo
(74) *Attorney, Agent, or Firm*—Sterne, Kessler, Goldstein & Fox P.L.L.C.

(57) ABSTRACT

A frame structure of a vehicle includes a flywheel housing, an intermediate housing and a transmission case that are connected to each other along a longitudinal axis of the vehicle to constitute a vehicle frame with an inner space for accommodating a running-power transmission path for transmitting power from an engine to drive wheels via a HST unit. The flywheel housing has a first end connected to the engine and a second open end opposite to the first end along the longitudinal axis of the vehicle. The intermediate housing has a hollow shape with a first end and a second end located along the longitudinal axis of the vehicle. The first end has an abutting surface against which the second end of the flywheel housing abuts, a support surface located radially inwardly of the abutting surface so as to support the HST unit, and an opening surrounded by the support surface. The opening serves as a first-end opening of the intermediate housing along the longitudinal axis of the vehicle. The abutting surface and the support surface along the longitudinal axis of the vehicle are located so that at least a portion of the HST unit is accommodated within the flywheel housing.

3 Claims, 15 Drawing Sheets

U.S. PATENT DOCUMENTS

| | | |
|---|---|---|
| 3,922,931 A | 12/1975 | Osujyo et al. |
| 4,932,208 A | 6/1990 | Koyama et al. |
| 6,003,391 A | 12/1999 | Kojima et al. |
| 6,119,552 A | 9/2000 | Matsufuji |
| 6,233,931 B1 | 5/2001 | Matsufuji |
| 6,250,414 B1 | 6/2001 | Sato et al. |
| 6,419,041 B1 | 7/2002 | Nemoto |
| 6,553,759 B2 | 4/2003 | Matsufuji |
| 6,637,294 B2 | 10/2003 | Nemoto |
| 6,722,464 B2 | 4/2004 | Nakatani et al. |
| 6,877,580 B2 | 4/2005 | Hasegawa et al. |
| 6,899,190 B2 | 5/2005 | Bordini |
| 6,918,850 B2 | 7/2005 | Hasegawa et al. |
| 6,938,718 B1 * | 9/2005 | Okada et al. ............... 180/305 |
| 7,017,446 B1 * | 3/2006 | Okada et al. ............. 74/606 R |
| 7,131,267 B1 * | 11/2006 | Keller et al. .................. 60/399 |
| 7,163,077 B2 * | 1/2007 | Hasegawa et al. .......... 180/305 |
| 2002/0033093 A1 | 3/2002 | Nemoto |
| 2003/0162618 A1 | 8/2003 | Hasegawa et al. |
| 2004/0118627 A1 | 6/2004 | Ohtsuki et al. |
| 2005/0172740 A1 | 8/2005 | Ebihara et al. |
| 2007/0012503 A1 * | 1/2007 | Iida ........................... 180/305 |

FOREIGN PATENT DOCUMENTS

| | | |
|---|---|---|
| DE | 1188958 | 3/1965 |
| DE | 19538808 | 5/1996 |
| EP | 0 899 477 A2 | 3/1999 |
| JP | 50-109361 | 8/1975 |
| JP | 63263136 | 10/1988 |
| JP | 3024352 | 2/1991 |
| JP | 4171346 | 6/1992 |
| JP | 6199140 | 7/1994 |
| JP | 8-002267 | 1/1996 |
| JP | 2000289478 | 10/2000 |
| JP | 2001315538 | 11/2001 |
| JP | 2002283860 | 10/2002 |

OTHER PUBLICATIONS

European Search Report for European Application No. EP 04 00 1710, European Patent Office, dated Jan. 5, 2007.

* cited by examiner

FRAME STRUCTURE OF A VEHICLE

BACKGROUND OF THE INVENTION

1. Field of the Invention

The present invention relates to a frame structure of a vehicle that is designed to accommodate a running-power transmission mechanism and constitute at least a part of a vehicle frame.

2. Related Art

A known frame structure as disclosed such as in Japanese Patent Application Laid-open No. Hei-08-2267 is formed by connection members made up of a flywheel housing, an intermediate housing and/or a transmission case that are connected to each other along a longitudinal axis of the vehicle (hereinafter simply referred to a vehicle longitudinal axis).

The frame structure of the above type has an insufficient capability in a point as discussed below.

First of all, the frame structure of the above-cited reference includes a front housing (flywheel housing) that accommodates a flywheel and a sub-speed change unit, a transmission case connected to the front housing and a rear housing connected to the transmission case. Specifically, the front housing has a partition wall formed integral therewith substantially at the center of the front housing with respect to the vehicle longitudinal axis. The partition wall supports a drive shaft and an intermediate shaft of the sub-speed change unit in cooperation with a bearing frame that is connected to a rear side of the front housing.

According to the above arrangement, the assembling of the frame structure involves troublesome works, which include connecting the bearing frame to the rear side of the front housing while supporting the rear ends of the drive shaft and the intermediate shaft on the bearing frame, with the front ends of the drive shaft and the intermediate shaft being supported on the partition wall and the other constitutional members of the sub-speed change unit such as a friction clutch being placed within the front housing.

Another problem caused by the frame structure of the above-cited reference is that the transmission case is hard to be reduced in size since the transmission case, which accommodates a main-speed change unit, is located in the intermediate position between the front housing and the rear housing. Specifically, in the above-cited reference, transmission shafts (a hollow propeller shaft and a main shaft inserted therethrough) are disposed coaxially with a crank shaft of the engine, aiming at the reduction of the size of the front housing and the like. However, this arrangement requires the transmission shaft to be located with sufficient distance from a wall of the transmission case to provide a space for various transmission members such as gears and clutches to be mounted on the transmission shafts. Accordingly, a problem in that the transmission case is hard to be reduced in size cannot be addressed.

Another problem also lies in an arrangement of the vehicle structure of the above-cited reference in a case where a part or all of the inner space of the vehicle structure is utilized as a hydraulic fluid reservoir tank. Specifically, the hydraulic fluid stored in the reservoir tank is utilized for various hydraulic mechanisms mounted in the vehicle. Therefore, a sufficient amount of hydraulic fluid must be stored inside of the frame structure in order to avoid fluid running-out for the hydraulic mechanisms in a case where the frame structure is also used as a reservoir tank.

Specifically, variation in position or posture of the vehicle is directly reflected in the position or posture of the frame structure, since it constitutes a portion of the vehicle frame. That is, when the vehicle tilts due to such as running up or down a slope, the frame structure takes the same tilting position or posture. In such a tilting position or posture, the surface level of stored fluid is changed. Accordingly, fluid running-out for the hydraulic mechanisms is highly likely to occur when the amount of fluid stored in the reservoir tank is small. Therefore, it is necessary to store a sufficient amount of fluid inside of the frame structure in a case where the frame structure is also used as a reservoir tank.

On the other hand, hydraulic fluid stored inside of the frame structure may cause drag resistance in various transmission mechanisms placed inside of the frame structure. That is, a large amount of fluid stored inside of the frame structure may deteriorate transmission efficiency of various transmission mechanisms that are mounted also inside of the frame structure and hence immersed in the fluid.

Thus, there exist contradictory two demands, one for storing a sufficient amount of fluid so as to avoid fluid running out and another for storing a minimum amount of fluid so as to avoid causing resistance against the transmission mechanisms mounted inside of the vehicle frame. The prior frame structure is not designed to fully address these demands.

In consideration of the above prior art, it is an object of the present invention to provide a frame structure that ensures high efficiency assembly, while addressing the problems with the interconnected arrangement of a clutch housing, an intermediate housing and a transmission case along the vehicle longitudinal axis.

It is another object of the present invention to provide a frame structure that ensures high efficiency assembly as well as providing a free space above the intermediate housing, while addressing the problems with the interconnected arrangement of a clutch housing, an intermediate housing and a transmission case along the vehicle longitudinal axis.

It is still another object of the present invention to provide a frame structure that is capable of effectively preventing fluid for feeding to a HST unit running-out while keeping the amount of fluid stored in a reservoir tank as low as possible, which reservoir tank being constituted by at least a portion of an inner space of the frame structure that accommodates a running-power transmission path for transmitting power from an engine to drive wheels via the HDT unit and is arranged along the vehicle longitudinal axis extending from a first side to a second side of the vehicle.

SUMMARY OF THE INVENTION

According to one aspect of the present invention, there is provided a frame structure of a vehicle that includes a flywheel housing, an intermediate housing and a transmission case that are connected to each other along a longitudinal axis of the vehicle to constitute a vehicle frame with an inner space for accommodating a running-power transmission path for transmitting power from an engine to drive wheels via a HST unit. The flywheel housing has a first end connected to the engine and a second open end opposite to the first end along the longitudinal axis of the vehicle. The intermediate housing has a hollow shape with a first end and a second end located along the longitudinal axis of the vehicle, the first end having an abutting surface against which the second end of the flywheel housing abuts, a support surface located radially inwardly of the abutting surface so as to support the HST unit, and an opening surrounded by the support surface, the opening serving as a first-end opening of the intermediate housing along the longitudinal axis of the vehicle. The abutting surface and the support surface along the longitudinal axis of the vehicle are located so that at least a portion of the HST unit is accommodated within the flywheel housing.

With the above arrangement, it is possible to easily connect the HST unit to the support surface of the intermediate housing. Further, the connection of the intermediate housing to the flywheel housing can be made after connecting the HST unit to the intermediate housing. As a result, it is possible to achieve high efficiency assembly.

According to another aspect of the present invention, there is provided a frame structure of a vehicle that includes a flywheel housing, an intermediate housing and a transmission case that are connected to each other along a longitudinal axis of the vehicle to constitute a vehicle frame with an inner space for accommodating a running-power transmission path for transmitting power from an engine to drive wheels via a HST unit. The flywheel housing has a first abutting surface and a second abutting surface respectively located closer to a first end and a second end of the flywheel housing along the longitudinal axis of the vehicle, in which the first abutting surface is connected to the engine, and the second abutting surface is connected to the intermediate housing. The second abutting surface has a first opening through which the HST unit can pass. The flywheel housing has a hollow shape with a center axis substantially coaxial with a crank shaft of the engine. The intermediate housing has a hollow body portion and a flange portion. The hollow body portion has a first end and a second end, and extending along the longitudinal axis of the vehicle with a center axis displaced downward from the crank shaft. The flange portion is located closer to the first end of the hollow body portion, and the flange portion has an opening in a radial center thereof, in which the opening of the flange portion serves as a first-end opening of the intermediate housing along the longitudinal axis of the vehicle. The flange portion has an abutting surface located opposite to the second abutting surface of the flywheel housing, a support surface located radially inward portion of the abutting surface so as to support the HST unit, and the first-end opening located radially inward of the support surface.

With the above arrangement, it is possible to improve efficiency in mounting the HST unit to the intermediate housing and connecting the intermediate housing to the flywheel housing, while locating a top wall of the intermediate housing as low as possible. Accordingly, it is possible to mount a step bar or board, which is to be mounted above the intermediate housing, on a lower portion.

In the above arrangement, preferably, the abutting surface and the support surface along the longitudinal axis of the vehicle are located so that at least a portion of the HST unit is accommodated within the flywheel housing.

In one embodiment, the HST unit includes a pump shaft operatively connected to said engine, a hydraulic pump unit driven by the pump shaft, a hydraulic motor unit for non-stepwisely changing the speed of drive power from the engine in cooperation with the hydraulic pump, an output shaft rotated by the hydraulic motor unit, and a center section supporting the hydraulic pump unit and the hydraulic motor unit and forming a hydraulic circuit for fluid communication between the hydraulic pump unit and the hydraulic motor unit. The center section is connected with the support surface of the flange portion so as to seal an inner space of the flywheel housing against the inner space of the intermediate housing in a liquid tight manner.

In the one embodiment, preferably, at least one of the hydraulic pump unit and the hydraulic motor unit is of a variable displacement type whose suction/discharge rates are variable by a slanting position of a hydraulic operation type output adjusting member. The hydraulic operation type output adjusting member is controlled by a switching valve in a valve unit provided outside of the flywheel, the intermediate housing and the transmission case.

Also in the one embodiment, preferably, the center section has a first side along the longitudinal axis of the vehicle forming a pump support surface which supports the hydraulic pump unit, and has a second side along the longitudinal axis of the vehicle forming a peripheral edge surface which abuts against the support surface of the flange portion and forming a motor support surface which is located radially inward of the peripheral edge surface and supports the hydraulic motor unit.

More preferably, the pump shaft has a first end along the longitudinal axis of the vehicle which extends into said flywheel housing so as to be operatively connected to the driving source, and a second end along the longitudinal axis of the vehicle which passes through the center section toward the second side of the longitudinal axis of the vehicle. The motor shaft has a second end along the longitudinal axis of the vehicle which extends into said intermediate housing toward the second side of the longitudinal axis of the vehicle. A main shaft operatively connected to the second end of said pump shaft and a propeller shaft operatively connected to the second end of said motor shaft are inserted through said intermediate housing along the longitudinal axis of the vehicle.

For example, a center plate may be interposed between the intermediate housing and the transmission case. The center plate bearing-supports the main shaft and the propeller shaft.

The frame structure may further includes a center plate interposed between the intermediate housing and the transmission case so as to bearing-support the main shaft and the transmission shaft.

According to another aspect of the present invention, there is provided a frame structure of a vehicle extending from a first side to a second side of the vehicle along a longitudinal axis of the vehicle so as to constitute a vehicle frame as providing an inner space for accommodating a running-power transmission path for transmitting power from an engine to drive wheels via a HST unit, in which at least a portion of the inner space defines a hydraulic fluid reservoir space. The hydraulic fluid reservoir space has a partition wall that divides the hydraulic fluid reservoir space into a filter housing portion for accommodating a filter and a main portion other than the filter housing portion. The partition wall has a communication port for communication between the filter housing portion and the main portion in a lower region of the hydraulic fluid reservoir space. The filter housing portion is arranged so that at least hydraulic fluid for replenishing the HST unit is taken out from the filter portion.

The thus arranged frame structure is capable of securely getting hydraulic fluid for the HST unit out of the fluid reservoir space, while keeping the amount of hydraulic fluid stored therein as low as possible. Accordingly, it is possible to effectively prevent running-out of hydraulic fluid for the HST unit during hydraulic fluid is drawn out of the frame structure, while preventing deterioration in power transmission efficiency of power transmission mechanisms placed inside of the frame structure.

Preferably, the partition wall is located so as to have the communication hole located substantially at the center of the hydraulic fluid reservoir space with respect to a vehicle width direction. This arrangement makes it possible to effectively prevent the fluid running-out even when the vehicle makes a turn and tilts rightward or leftward.

Preferably, the partition wall is located so as to have the communication hole located substantially at the center of the hydraulic fluid reservoir space with respect to the longitudinal axis of the vehicle. This arrangement makes it possible to effectively prevent the fluid running-out when the vehicle has tilted forward or rearward such as running up and down a slope.

More preferably, the frame structure is arranged so that an oil heater can be installed in proximity of the communication hole. This arrangement makes it possible to efficiently heat hydraulic fluid drawn out of the frame structure and hence effectively prevent deterioration in hydraulic effect due to deterioration of the viscosity of hydraulic fluid such as during cold season.

In one embodiment of the another aspect of the present invention, the frame structure includes a flywheel housing, an intermediate housing and a transmission case that are connected to each other along the longitudinal axis of the vehicle. In this arrangement, the flywheel housing has a hollow shape with a first end and a second end located along the longitudinal axis of the vehicle. The first end has a first-end opening and a first-end abutting surface surrounding the first-end opening. The second end has a second-end opening and a second-end abutting surface surrounding the second-end opening. The intermediate housing has a first end and a second end located along the longitudinal axis of the vehicle. The first end has an abutting surface opposed to the second-end surface of the flywheel housing, a support surface located radially inward of the abutting surface so as to support the HST unit, and an opening surrounded by the support surface. The opening of the intermediate housing serves as a first-end opening of the intermediate housing along the longitudinal axis of the vehicle. The second end has an opening serving as a second-end opening of the intermediate housing. The support surface of the intermediate housing and the HST unit supported by the support surface are arranged so as to divide the inner spaces of the flywheel housing, the intermediate housing and the transmission case into a space of a dry chamber for accommodating a flywheel and the hydraulic fluid reservoir space.

In the above embodiment, for example, the transmission case has a bulge that extends in the vehicle width direction as extending from an opening of the first end of the transmission case towards the second end of the transmission case along the longitudinal axis of the vehicle. The bulge provides a space for the filter housing portion so that a filter can be installed in place by introducing the same from the first side of the longitudinal axis of the vehicle.

Alternatively, the transmission case has the filter housing portion on a first side of the lateral axis of the vehicle at a location from the first end opening of the longitudinal axis of the vehicle to the second end of the longitudinal axis of the vehicle. The intermediate housing has a recess on the first side of the lateral axis of the vehicle at the second end of the intermediate housing along the longitudinal axis of the vehicle. The recess is dented toward the second side of the lateral axis of the vehicle so that a filter can be installed in the filter housing portion from the first side of the transmission case along the longitudinal axis of the vehicle.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

Figure 1:
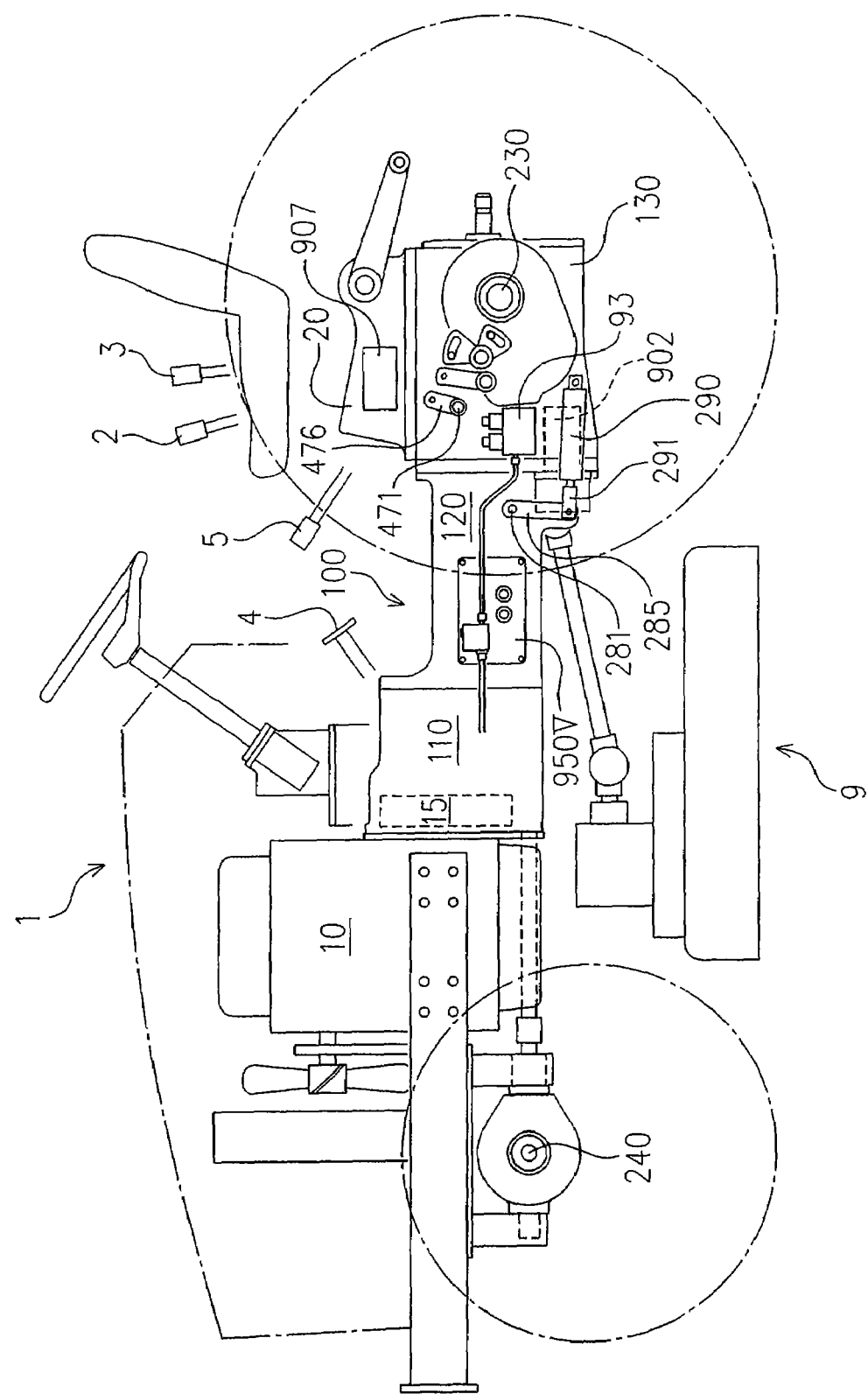
FIG. 1 is a schematic side view of a vehicle, to which the frame structure according to one embodiment of the present invention has been applied.
Figure 2:
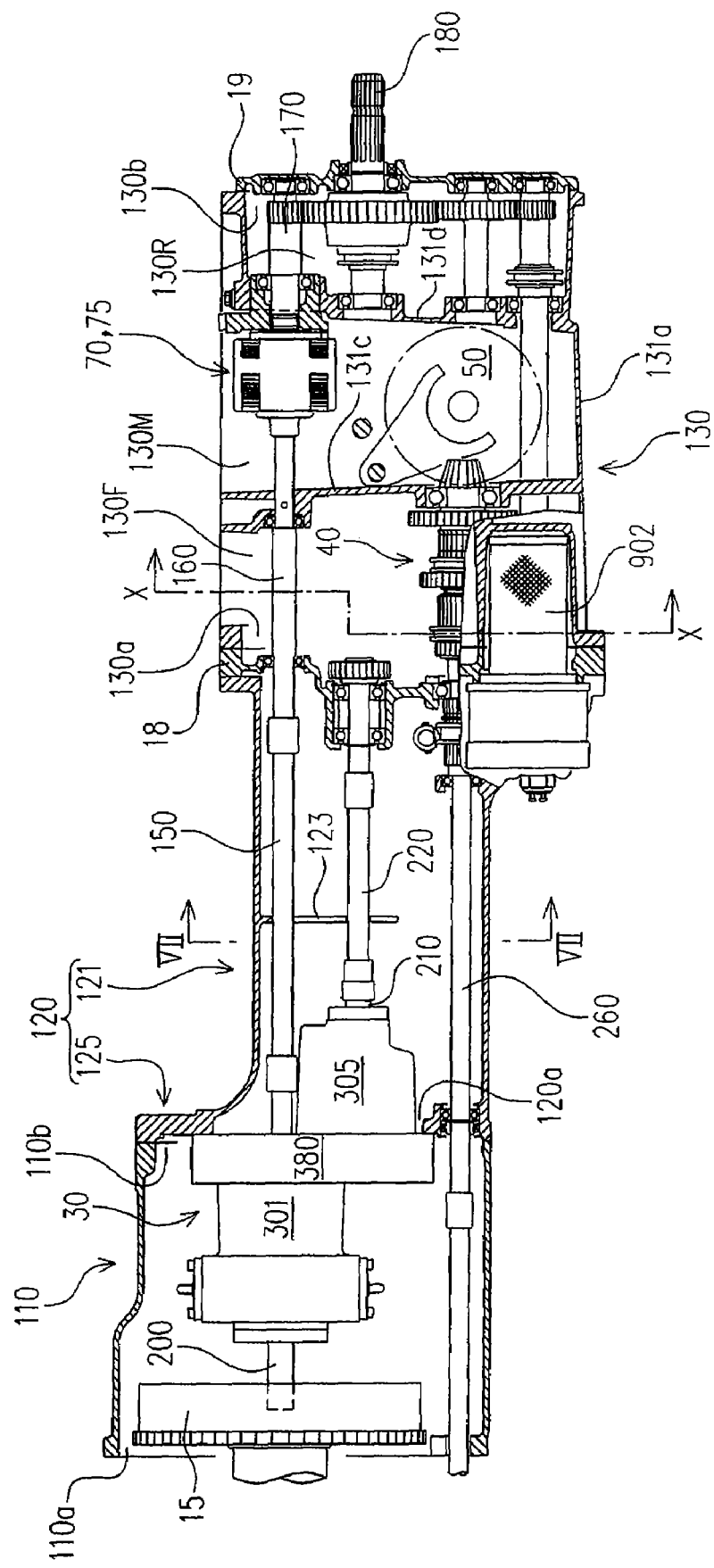
FIG. 2 is a side view of the frame structure of FIG. 1 in longitudinal cross section.

The description will be made for a preferred embodiment of the present invention with reference to the accompanied drawings. FIG. 1 is a schematic side view of a working vehicle 1, to which the frame structure of this embodiment has been applied. FIG. 2 is a side view of the frame structure in longitudinal cross section.

As illustrated in FIGS. 1 and 2, a frame structure 100 of this embodiment constitutes at least a portion of the vehicle frame. Specifically, the frame structure 100 includes a flywheel housing 110 connected to an engine 10, an intermediate housing 120 connected to the flywheel housing 110 and a transmission case 130 connected to the intermediate housing 120.

Figure 3:
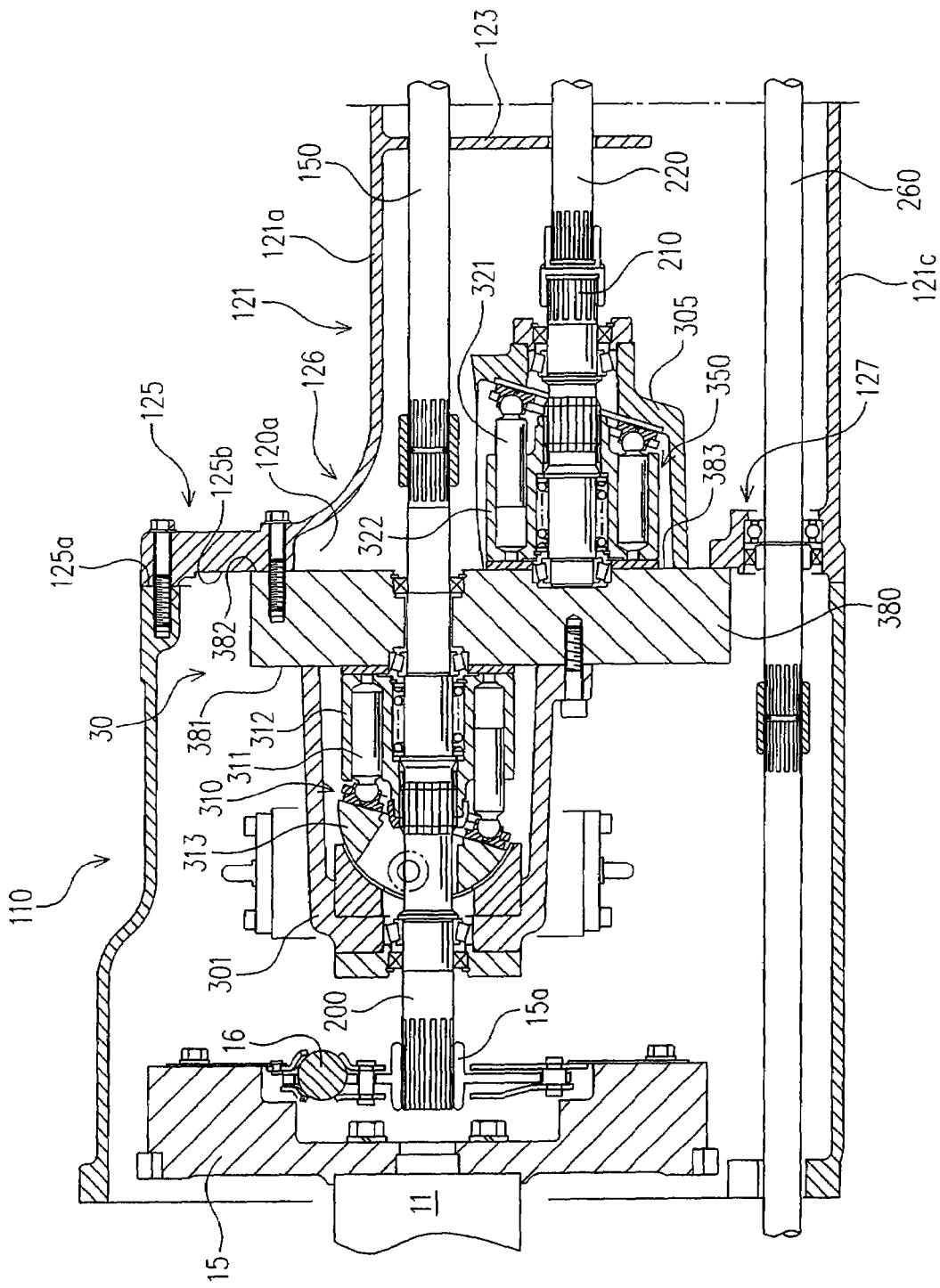
FIG. 3 is an enlarged view of a flywheel housing of the frame structure of FIGS. 1 and 2 in longitudinal cross section.
Figure 4:
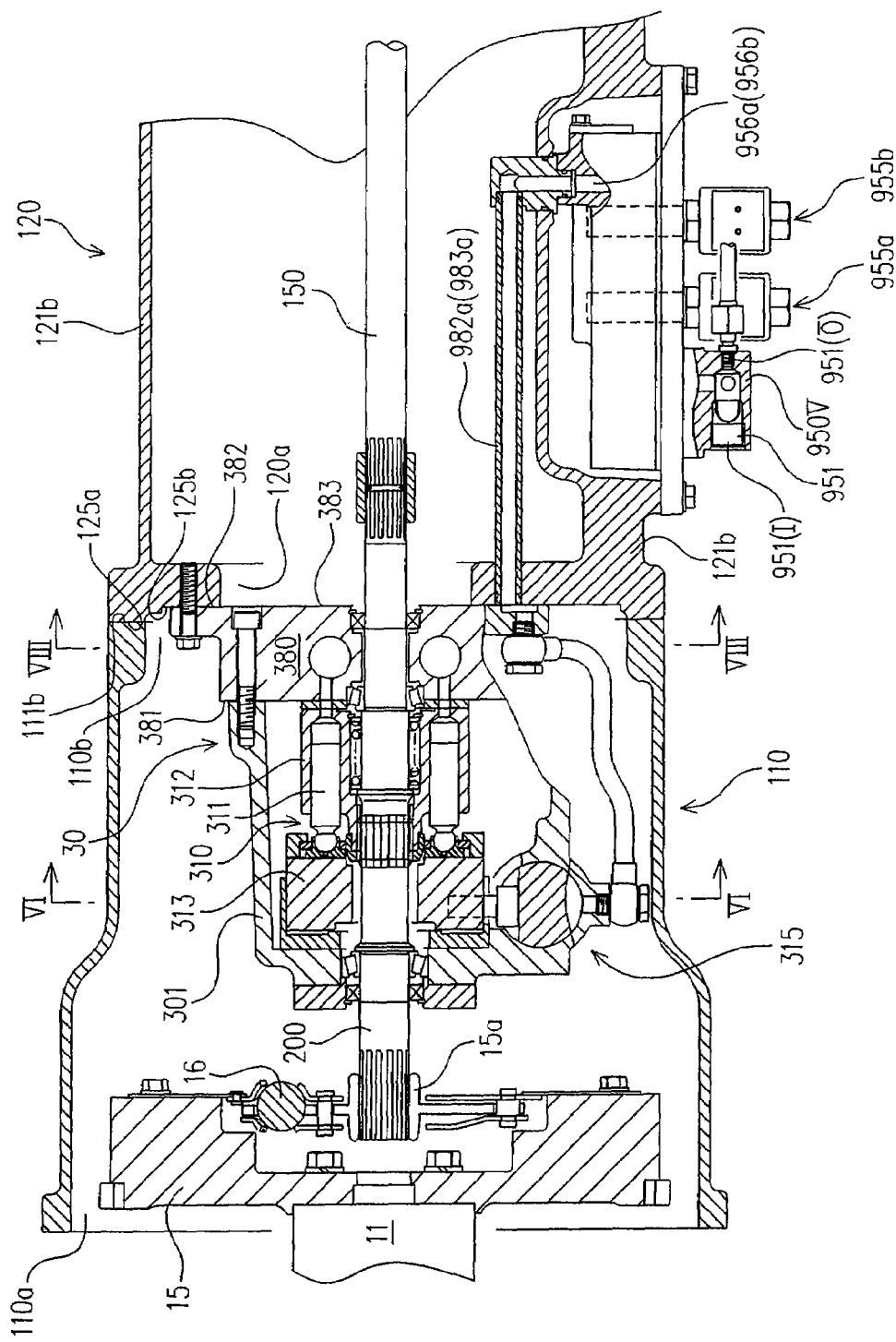
FIG. 4 is an enlarged view of the flywheel housing of FIG. 3 in lateral cross section.

FIGS. 3 and 4 are respectively enlarged side view and plane view of the flywheel housing in longitudinal and lateral cross sections. As illustrated in FIGS. 1 to 4, the flywheel housing 110 has a first end and a second end along the vehicle longitudinal axis (hereinafter sometimes referred to a first longitudinal end and a second longitudinal end), which ends respectively have a first opening 110a and a second opening 110b, and a hollow shape with a center axis substantially coaxial with a crank shaft 11 of the engine. The first opening 110a is sized to allow a flywheel 15, which is operatively connected to the engine 10, to pass therethrough. The second opening 110b is sized to allow a HST unit 30 (hereinafter described) to pass therethrough. The first end of the flywheel housing 110 is connected to the engine so that the flywheel housing 110 is aligned along the vehicle longitudinal axis.

In this embodiment, the engine 10 is located on the front side of the vehicle along the vehicle longitudinal axis. As used throughout the description, the first and second longitudinal ends along the vehicle longitudinal axis respectively represent the front and rear sides of the vehicle and therefore will be replaced with them according to need and circumstance in the following description. Also, the directional terms such as forward and rearward are used in reference to the vehicle longitudinal axis.

Figure 5:
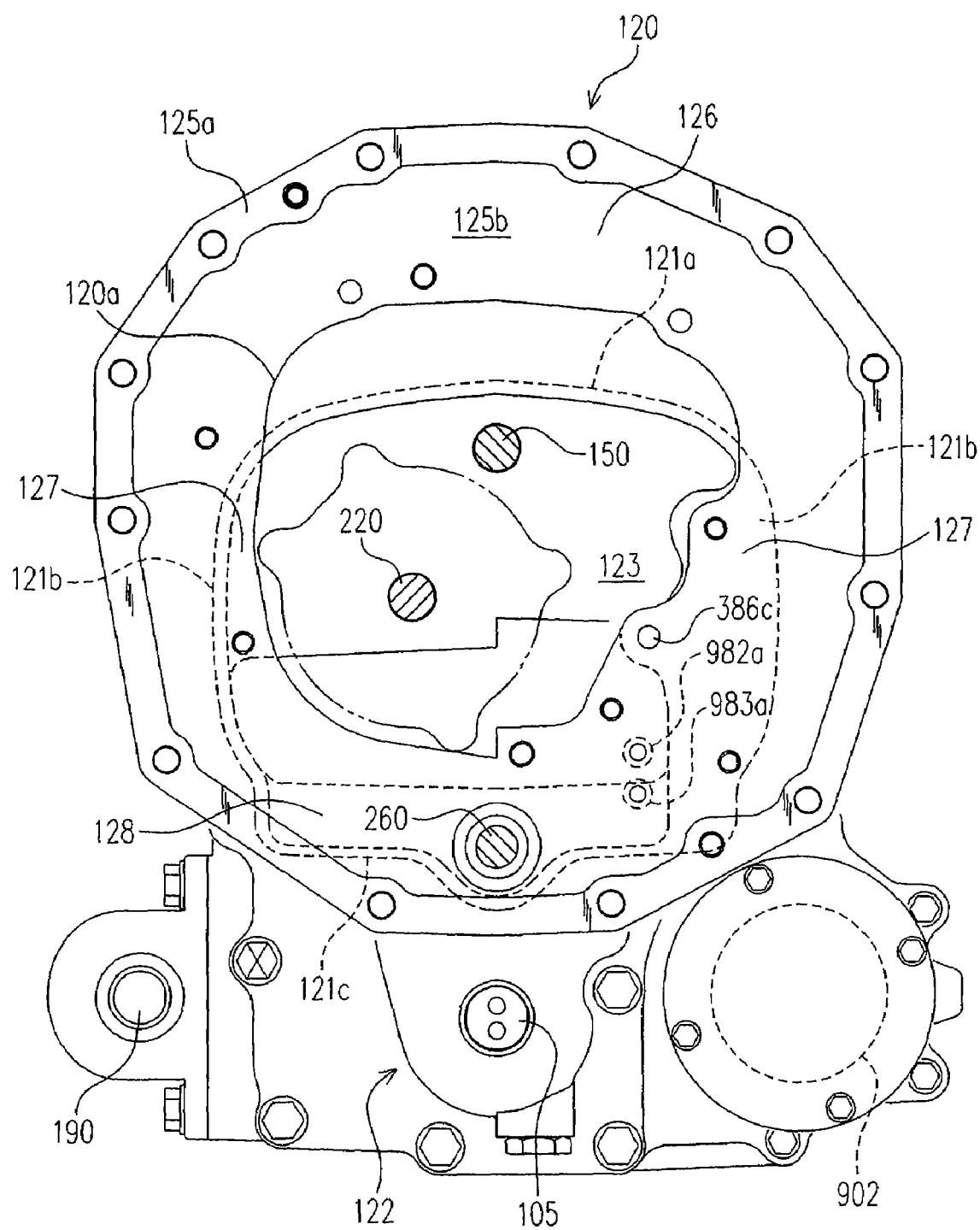
FIG. 5 is a front side view (a first side view with respect to the longitudinal axis of the vehicle) of an intermediate housing in the frame structure of FIGS. 1 and 2, with a HST unit removed.
Figure 6:
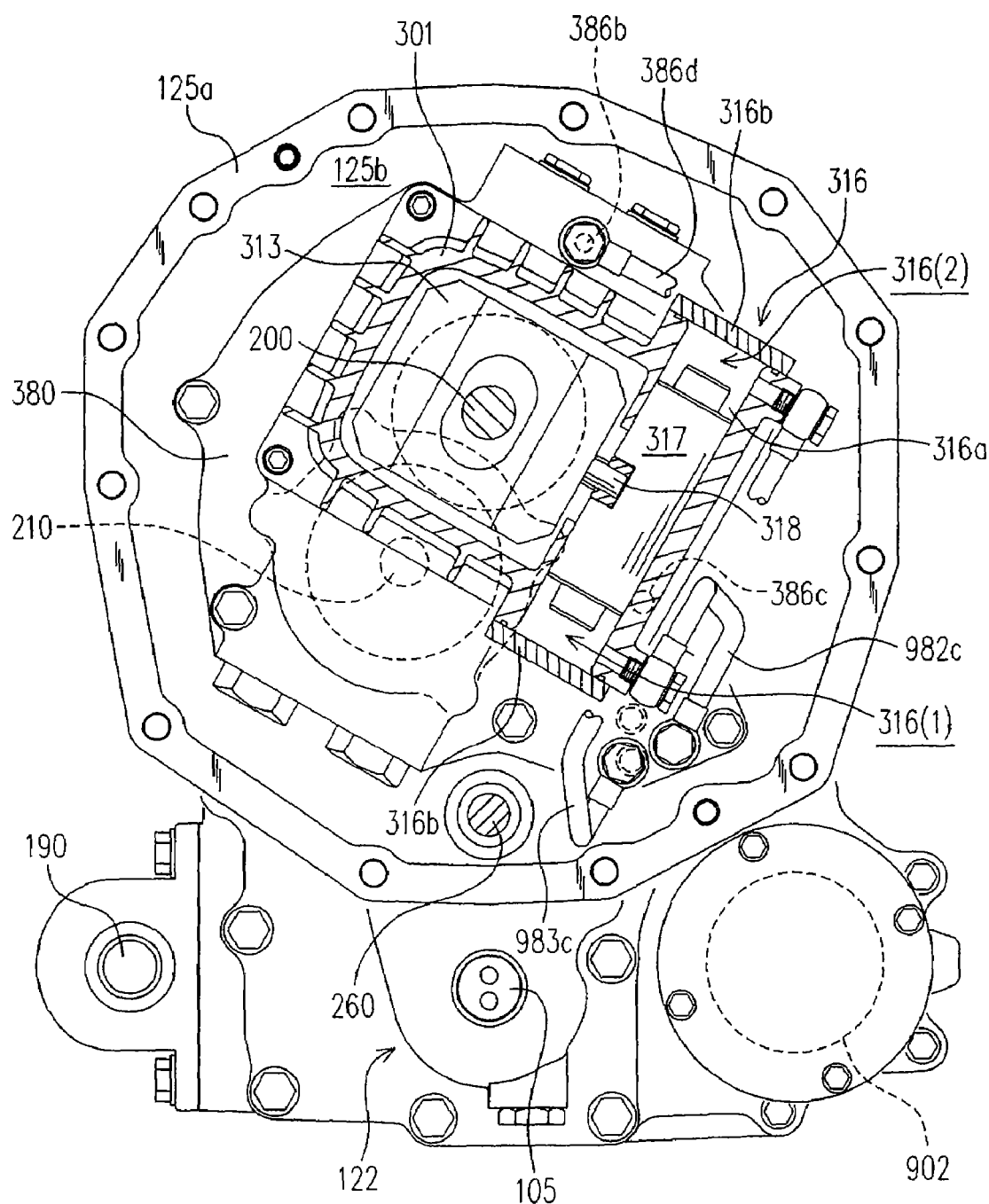
FIG. 6 is a cross sectional view taken along a line VI-VI in FIG. 2, showing a front side view of a part of the HST unit in lateral cross section.
Figure 7:
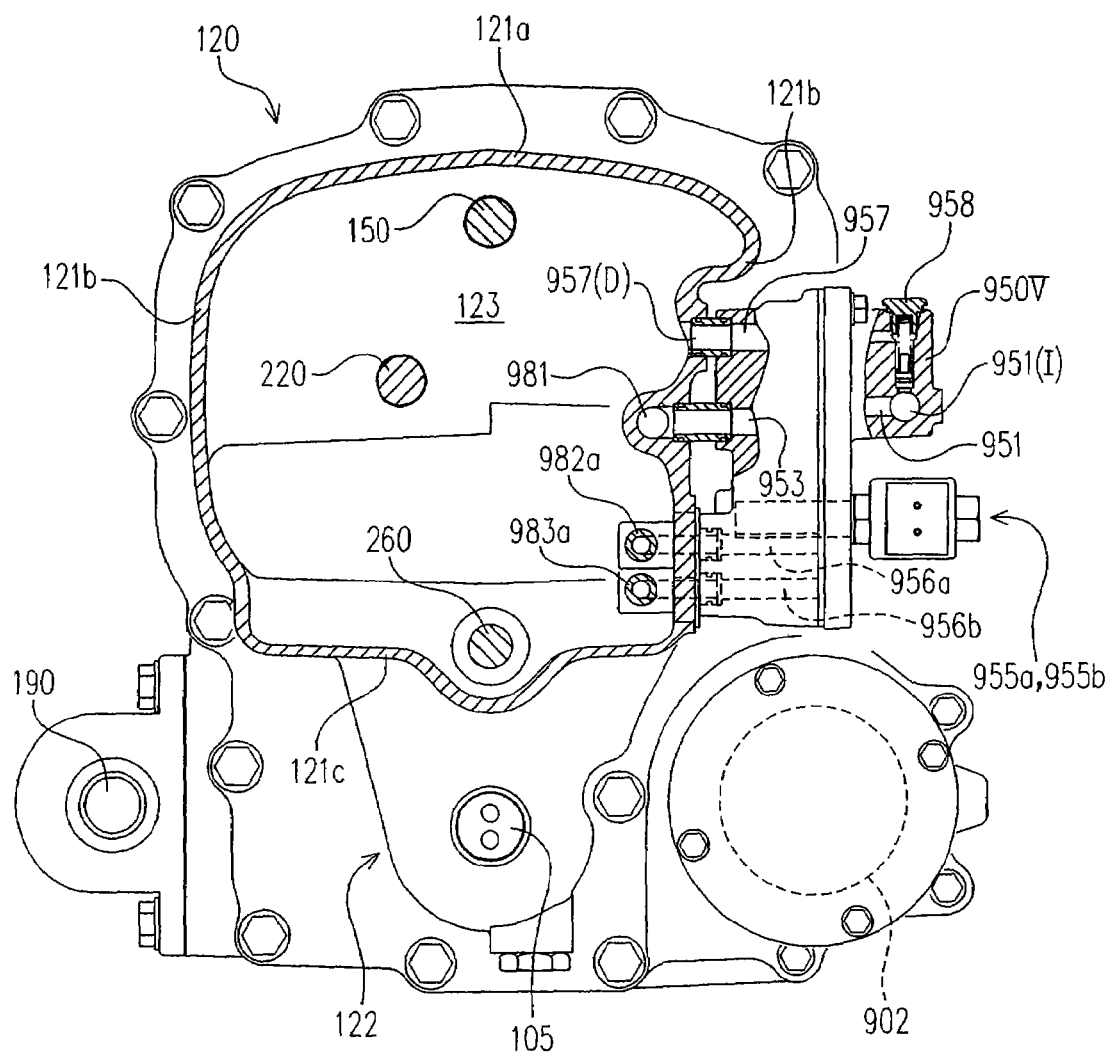
FIG. 7 is a cross sectional view taken along a line VII-VII in FIG. 2.

The intermediate housing 120 includes a hollow body portion 121 extending along the vehicle longitudinal axis and a front flange portion 125 located forward of the body portion 121. The front flange portion 125 provides a support area for the HST unit 30 as well as an area for connection with the flywheel housing 110. FIG. 5 is a front side view of the intermediate housing with the HST unit 30 removed. FIGS. 6 and 7 are cross sectional views taken along line VI-VI in FIG. 4 and line VII-VII in FIG. 2 respectively.

Specifically, as illustrated in FIGS. 5 and 6, the front flange portion 125 has a forward end (an end faces to the first side of the vehicle longitudinal axis), of which a radially outward portion forms an abutting surface 125a that provides an area for connection with the flywheel housing 110.

The abutting surface 125a is designed to be brought into abutment with a rear end 111b (an end faces to the second end of the vehicle longitudinal axis) of the flywheel housing 110. The front flange portion 125 has a support surface 125b located radially inward of the abutting surface 125a of the forward end so as to provide a support area for the HST unit 30.

The front flange portion 125 has an opening 120a defined or surrounded by the support surface 125b. The opening 120a is formed in communication with a hollow area of the hollow body portion 121 and thus forms a front opening (an opening closer to the first side of the vehicle longitudinal axis) of the intermediate housing Now, the description will be made for the HST unit 30 supported on the support surface 125b.

As best illustrated in FIGS. 3 and 4, the HST unit 30 includes a pump shaft 200 whose front end is operatively connected to the engine 10, a hydraulic pump unit 310 which is driven by the pump shaft 200, a hydraulic motor unit 350 which non-stepwisely changes a driving force from the engine in cooperation with the hydraulic pump unit 310, a motor shaft 210 which is rotated by the hydraulic motor unit, and a center section 380 which supports the hydraulic pump unit and the hydraulic motor unit and has a hydraulic circuit which communicates the hydraulic pump unit and the hydraulic motor unit with each other so that fluid can flow therebetween.

In the drawings, a reference code 16 is a damper provided on the flywheel 15.

As illustrated in FIGS. 4 and 6, the center section 380 is connected to the support surface 125b such as to surround the opening 120a.

More specifically, the center section 380 has a first side of the vehicle longitudinal axis forming a pump support surface 381 which supports the hydraulic motor unit 350, and a second side of the vehicle the longitudinal axis forming a peripheral edge surface 382 which abuts against the support surface 125b of the flange portion 125 and forming a motor support surface 383 which is located radially inward of the peripheral edge surface 382 to support the hydraulic motor unit 350. The peripheral edge surface 382 is connected to the support surface 125b of the flange portion 125 so as to close the opening 120a.

That is, in this embodiment, the center section 380 is connected to the support surface 125b, thereby liquid-tightly separating an inner space in the flywheel housing 110 from an inner space of the intermediate housing 120. With this configuration, the inner space in the intermediate housing 120 can be used as an oil chamber, and the inner space in the flywheel housing 110 can be used as a dry chamber.

Figure 8:
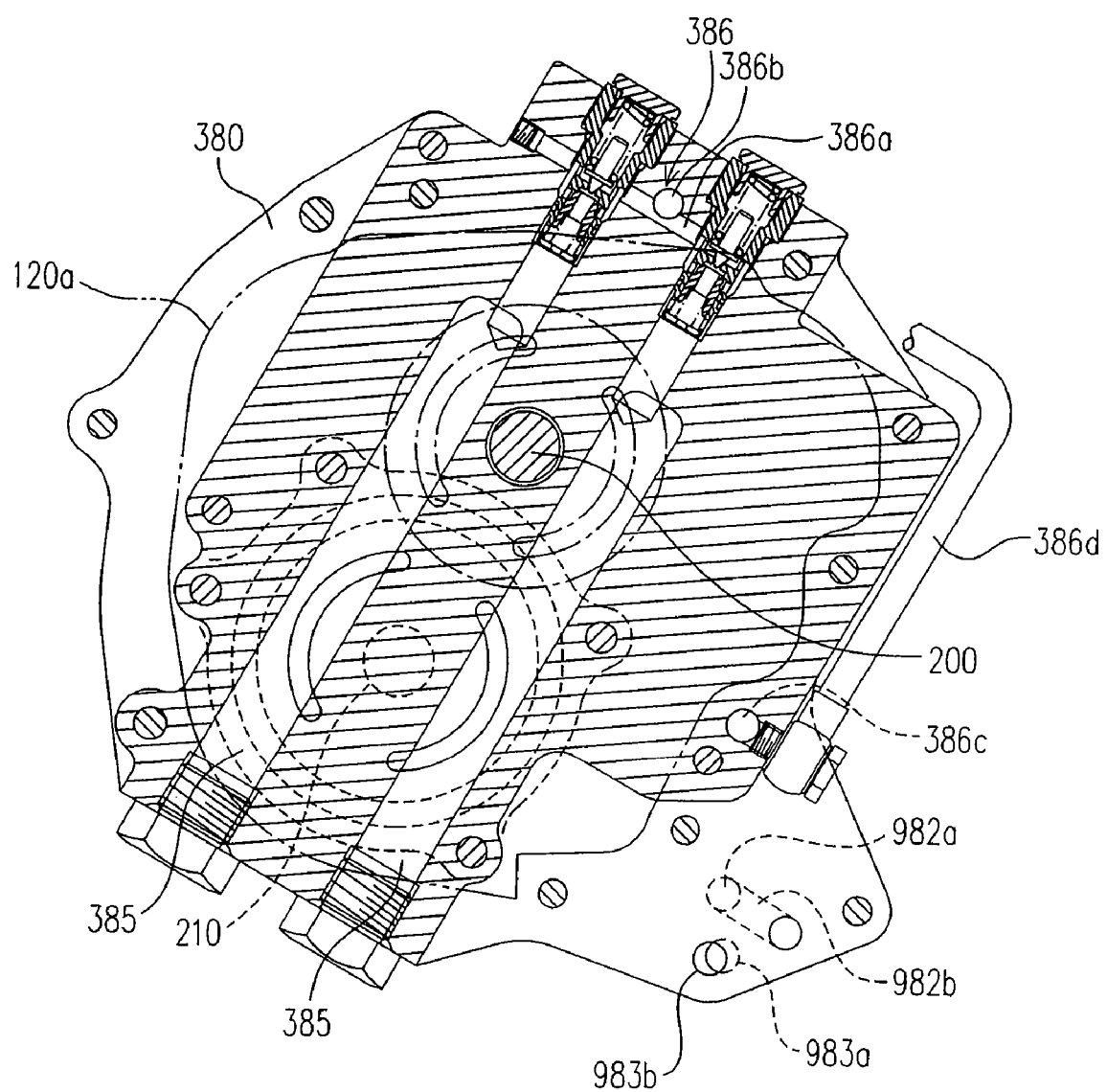
FIG. 8 is a cross sectional view taken along a line VIII-VIII in FIG. 4, showing a front side view of a center section in lateral cross section.

FIG. 8 is a sectional view taken along a line VIII-VIII in FIG. 4.

As illustrated in FIG. 8, the center section 380 further includes an oil passage (a pair of hydraulic lines 385 in this embodiment) which communicates the hydraulic pump unit 310 and the hydraulic motor unit 350 such that oil can flow therebetween, and a charge oil passage 386 for supplying charge oil into the oil passage 385.

A hydraulic circuit of the frame structure 100 according to this embodiment including that of the HST unit 30 will be described later.

In this embodiment, the HST unit 30 further includes a pump case 301 connected to the pump support surface 381 of the center section 380 such as to surround the hydraulic pump unit 310, and a motor case 305 connected to the motor support surface 383 of the center section 380 such as to surround the hydraulic motor unit 350.

The pump shaft 200 is supported by the pump case 301 and the center section 380 such that the pump shaft 200 can rotate around its axis and such that the pump shaft 200 is coaxial with the crank shaft 11 of the engine 10.

More specifically, a front end of the pump shaft 200 extends forward through the pump case 301 such that the front end is operatively connected to an output portion 15a of the flywheel 15, and a rear end of the pump shaft 200 extends rearward through the center section 380 such that the rear end is connected to a subsequent transmitting shaft (main shaft 150 in this embodiment).

A front end of the motor shaft 210 is supported by a bearing recess provided in the center section 380, and a rear end of the motor shaft 210 extends rearward through the motor case 305 such that the rear end is connected to a subsequent transmitting shaft (propeller shaft 220 in this embodiment).

At least one of the hydraulic pump unit 310 and the hydraulic motor unit 350 is of a variable displacement type whose suction/discharge rates are variable by a slanting position of an output adjusting member 313. By controlling the slanting position of the output adjusting member 313, non-stepwisely changed output is obtained from the motor shaft 210 which is driven by the hydraulic motor unit 350. In this embodiment, the hydraulic pump unit 310 is of a variable displacement type and the hydraulic motor unit 350 is of a fixed displacement type.

The hydraulic pump unit 310 includes a piston unit 311, a cylinder block 312 and the output adjusting member 313. As the pump shaft 200 rotates, the piston unit 311 rotates around the axis of the pump shaft 200 and reciprocates in association with the rotation. The cylinder block 312 supports the piston unit 311 such that the piston unit 311 can reciprocates. The cylinder block 312 is rotatably and slidably supported by the pump support surface 381 of the center section 380 with being in communication with the pair of hydraulic lines 385. The output adjusting member 313 controls a stroke length of the piston unit 311 according to the slanting position, and changes the suction/discharge rates by the piston unit 311.

The variable displacement type hydraulic pump unit 310 further includes a hydraulic operation device 315 (hereinafter described). The slanting position of the output adjusting member 313 is controlled by the hydraulic operation device 315.

In this embodiment, since the hydraulic pump unit 310 is of an axial piston type, a movable swash plate is employed as the output adjusting member 313. If the hydraulic pump unit is of a radial piston type, a cam ring is employed as the output adjusting member.

The fixed displacement type hydraulic motor unit 320 includes a cylinder block 322 and a piston unit 321. The cylinder block 322 is rotatably and slidably supported by the motor support surface 383 of the center section 380 with being in communication with the pair of hydraulic lines 385. The piston unit 321 is slidably supported in the cylinder block 322. The piston unit 321 reciprocates and rotates by hydraulic pressure from the pair of hydraulic line 385 to transmit the rotation to the motor shaft 210.

Thus, in the frame structure 100 of this embodiment, the intermediate housing 120 has, on its front side, the abutting surface 125a for abutment with the rear end of the flywheel housing 110, the support surface 125b located radially inward of the abutting surface 125a to support the HST unit 30, and the opening 120a defined by the support surface 125b to allow the transmission shafts respectively on the downstream sides of the pump shaft 200 and the motor shaft 210 to pass therethrough.

According to the above arrangement, the HST unit 30 which has been assembled independently is introduced from the front side of the intermediate housing 120 and connected to the support surface 125b, and then the intermediate housing 120 is connected to the flywheel housing 110 via the abutting surface 125a. This achieves ease of connection between the flywheel housing 110 and the intermediate housing 120 with the HST unit 30 held therein and hence contributes to improved assembly efficiency.

Preferably, the positions of the abutting surface 125a and the support surface 125b along the vehicle longitudinal axis are determined so as to allow at least a portion of the HST unit 30 supported on the support surface 125b to be positioned within the flywheel housing 110 in a state with the flywheel housing 110 connected to the intermediate housing 120.

That is, where the support surface 125b is located with a great distance away from the abutting surface 125a towards the second side of the vehicle longitudinal axis (towards the rear side in this embodiment), the HST unit 30 is entirely placed in the intermediate housing 120. This greatly widens the distance between the forward end of the intermediate housing 120a and the support surface 125b, and hence lowers efficiency in mounting the HST unit 30 to the support surface 125b.

Contrarily to the above, by positioning the abutting surface 125a and the support surface 125b along the vehicle longitudinal axis so that at least a portion of the HST unit 30 supported on the support surface 125b is positioned within the flywheel housing 110, it is possible to achieve an improved efficiency in mounting the HST unit 30 to the support surface 125b.

In a more preferable arrangement, the support surface 125b is positioned at the same level as or forward of the abutting surface 125a along the vehicle longitudinal axis. This arrangement can achieve a further improved efficiency in mounting the HST unit 30.

The frame structure 100 of this embodiment can achieve an improved efficiency in mounting the HST unit 30 and connecting the flywheel housing 110 to the intermediate housing 120, as well as securing a free space above the intermediate housing 120 as much as possible. This point will be mentioned in detail below.

As best illustrated in FIG. 2, in this embodiment, while the HST unit 30 is accommodated in the flywheel housing 110 and a main-speed change unit 40, a PTO clutch unit 70 and the like (hereinafter described) are accommodated in the transmission case 130, no transmission units such as a speed change mechanism and a clutch mechanism are disposed in the intermediate housing 120. That is, only the transmission shafts such as a main shaft 150 and a propeller shaft 220 respectively connected to the pump shaft 200 and the motor shaft 210 are accommodated in the intermediate housing 120. In this arrangement, there is no need to mount gears, friction plates and the like on the transmission shafts such as the main shaft 150. Accordingly, the transmission shafts can be located in proximity with a wall of the intermediate housing 120.

The above points were taken into account in the frame structure 100 of this embodiment. Accordingly, the hollow body portion 121 has a center axis displaced downward from a center axis of the flywheel housing 110 so as to locate a top wall 121a of the hollow body portion 121 of the intermediate housing 120 as close as possible to the transmission shaft (the main shaft 150 in this embodiment). The front flange portion 125 of the intermediate housing 120 has a lower side located substantially at the same level as that of the hollow body portion 121, and an upper side higher than that of the hollow body portion 121 so as to enable the connection between the flywheel housing 110 and the hollow body portion 121 with their center axes displaced from each other.

That is, as illustrated in FIG. 5, the front flange portion 125 has an upper extension 126 extending from the top wall 121a of the hollow body portion 121 towards the radially outward side or upper side of the hollow body portion 121, a lateral extension 127 extending from a lateral wall 121b of the hollow body portion 121 towards the radially outer and inner sides of the hollow body portion 121, and a lower extension 128 extending from a bottom wall 121c of the hollow body portion 121 towards the radially inner side or upper side of the hollow body portion 121, so that the abutting surface 125a located opposite to the rear end 111b of the flywheel housing 110, the support surface 125b located radially inward of the abutting surface 125a to support the HST unit 30, and the front opening 120a located radially inward of the support surface 125b are respectively defined.

Thus, in the frame structure 100, substantially only the transmission shaft(s) (the main shaft 150 and the propeller shaft 220 in this embodiment) is present in the intermediate housing 120, thereby displacing the axis of the hollow body portion 121 of the intermediate housing 120 downward from the axis of the flywheel housing 110 so as to locate the top wall of the hollow body portion 121 as close as possible to the transmission shaft (the main shaft 150 in this embodiment), and connecting the flywheel housing 110 by the front flange portion 125 to the hollow body portion 121 with both axes displaced from each other.

The above arrangement can provide a free space above the hollow body portion 121, thereby providing an improved design flexibility in designing a vehicle. Particularly, when a step bar or board is to be mounted on the top wall 121a of the hollow body portion 121 (see FIG. 1), it can be mounted as low as possible by the above arrangement, thereby enabling the driver to easily getting on and off the driver seat.

Now, the description will be made for the connection structure between the intermediate housing 120 and the transmission case 130.

Figure 9:
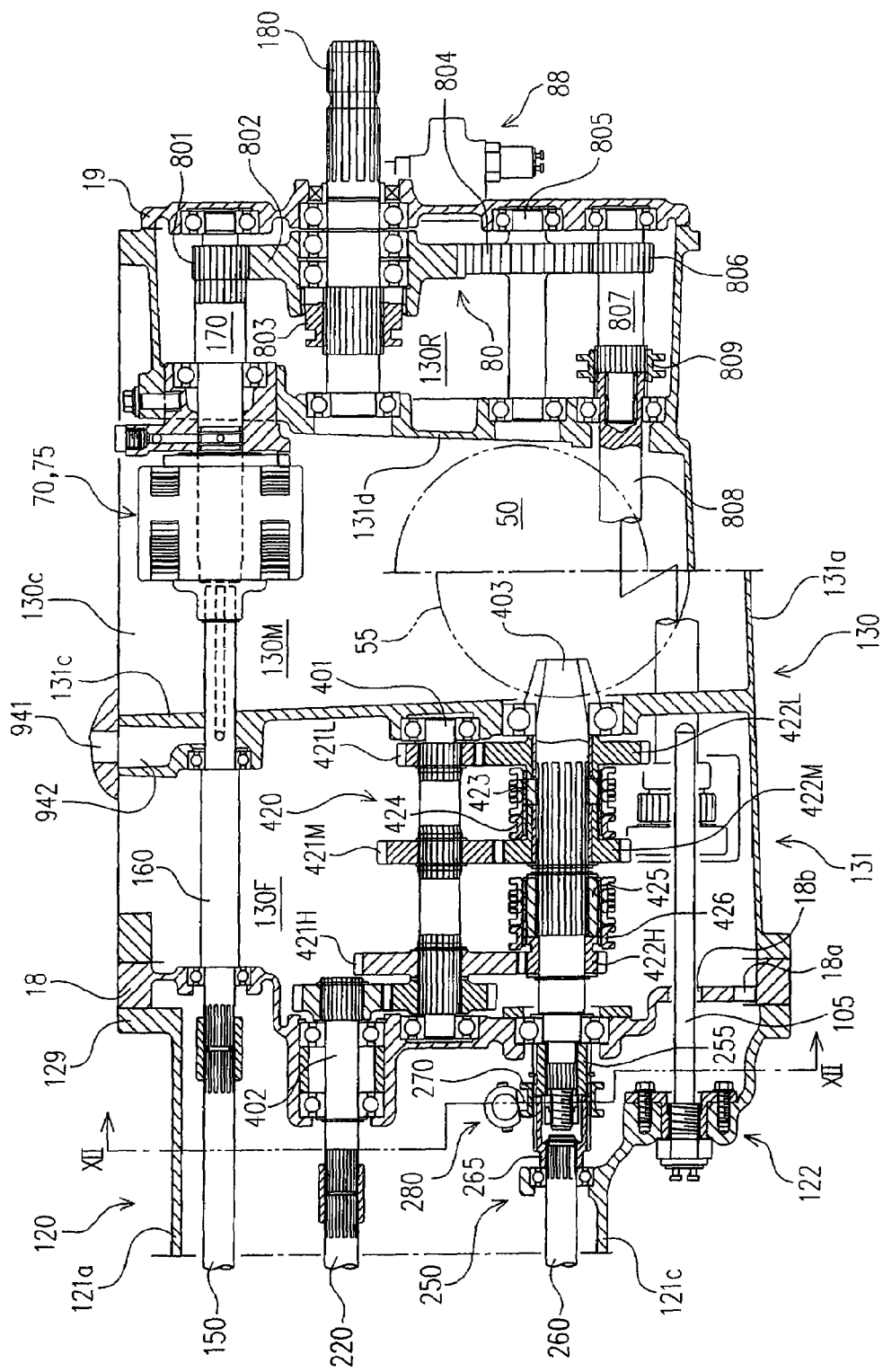
FIG. 9 is a side view of a transmission case of the frame structure of FIGS. 1 and 2 in longitudinal cross section.

FIG. 9 is a side view of the transmission case 130 and its periphery in longitudinal cross section.

As illustrated in FIG. 9, the intermediate housing 120 includes a rear flange portion 129 located rearward of the hollow body portion 121. In this embodiment, the bottom wall 121c of the hollow body portion 121 has a rear end that downwardly bulges to form a downward bulge 122 that is designed to allow a heater (hereinafter described) to be mounted therein from the outside (from the front side in this embodiment).

The intermediate housing 120 is separably connected via a center plate 18 to the transmission case 130 for accommodating various transmission mechanisms (hereinafter described). The center plate 18 acts as a bearing member for transmission shafts respectively downstream to the pump shaft 200 and the motor shaft 210.

According to the thus arranged frame structure 100 of this embodiment, bearing members, which require complicated manufacturing process to be manufactured, are formed independently of cast parts, namely the flywheel housing 110, the intermediate housing 120 and the transmission case 130, as many as possible, aiming at achieving a simplified structure of the cast parts, namely the flywheel housing 110, the intermediate housing 120 and the transmission case 130, and hence reduction of the manufacturing cost.

That is, in the frame structure 100 of this embodiment, as described above, the pump shaft 200 and the motor shaft 210 are respectively supported by a corresponding case of the pump case 301 and the motor case 305, and the center section 380. Further, the transmission shafts 150, 200 respectively downstream to the pump shaft 200 and the motor shaft 210 are supported by the center plate 18. Accordingly, it is possible to reduce the number of downstream processes subjected to the flywheel housing 110, the intermediate housing 120 and the transmission case 130 made by casting, such as boring bearing holes, as much as possible, and hence reduce the manufacturing cost.

Now, the description will be made for the transmission mechanism of the vehicle 1, to which the frame structure 100 of this embodiment has been applied. The detailed structure of the transmission case 130 will be described later.

The vehicle 1 has a running-power transmission mechanism for transmitting power from a power source 10 to the drive wheels, and a PTO transmission mechanism for transmitting power from the drive source 10 to an attached device such as a mower. First, the description will be made for the running-power transmission mechanism.

The running-power transmission mechanism includes the HST unit 30, the propeller shaft 220 extending along the vehicle longitudinal axis and connected to the motor shaft 210 in such a manner to be relatively non-rotatably around its axis, a sub-speed change unit 40 located downstream of the propeller shaft 220 with respect to the power transmission direction, and a differential gear unit 50 for transmitting power from the sub-speed change unit 40 to a pair of main transmission shafts (a pair of rear axles in this embodiment), enabling them to be rotated at different speeds.

As best illustrated in FIG. 2, the propeller shaft 220 has a front end connected to the motor shaft 210 in such a manner as to be relatively non-rotatably around its axis and a rear end supported by the center plate 18. Preferably, the hollow body portion 121 of the intermediate housing 120 is integrally formed with a bearing wall 123 that extends radially inwardly from an inner circumference of the top wall 121a, so that a center portion of the propeller shaft 220 can be bearing-supported by the bearing wall 123. With the above arrangement, it is possible to support the propeller shaft 220 in a secure manner.

Figure 10:
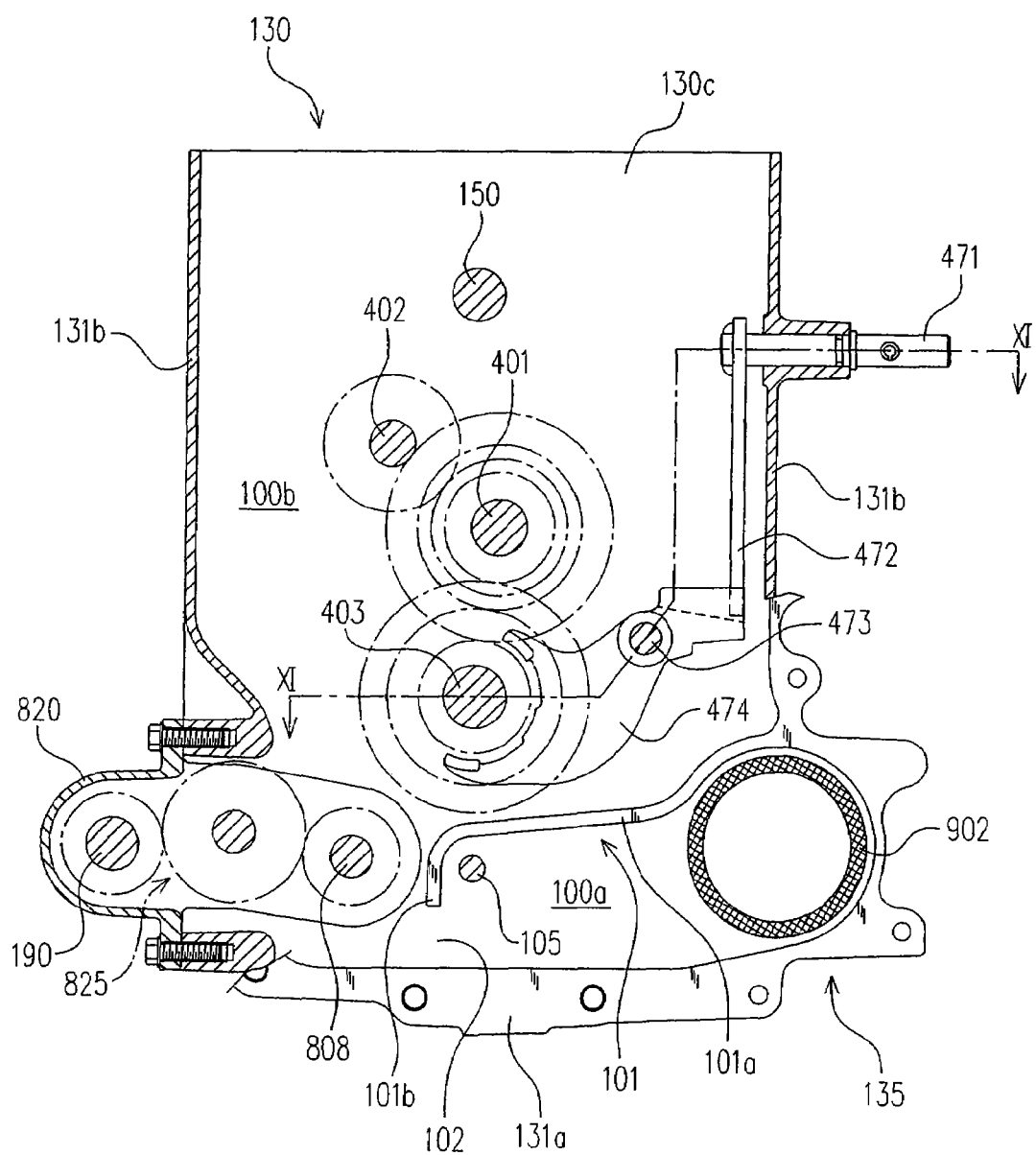
FIG. 10 is a cross sectional view taken along a line X-X in FIG. 2, showing a front view of the transmission case in lateral cross section.

The sub-speed change unit 40 is accommodated in the transmission case 130, as illustrated in FIG. 2. Now, the description will be made for the structure of the transmission case 130. FIG. 10 is a cross sectional view taken along a line X-X in FIG. 2.

As illustrated in FIGS. 2 and 10, the transmission case 130 has a body portion 131 having a front opening 130a and a rear opening 130b. The body portion has a bottom wall 131a extending along the vehicle longitudinal axis, a pair of lateral walls 131b extending upwardly from the opposite sides of the bottom wall 131a with respect to the vehicle widthwise direction, a first intermediate wall 131c extending upwardly from an inner circumference of the bottom wall 131a in such a manner as to divide an inner space defined by the bottom wall 131a and the pair of side walls 131b into a front section and a rear section, and a second intermediate wall 131d located rearward of the first intermediate wall 131c and extending upwardly from the inner circumference of the bottom wall 131a in such a manner as to further divide the rear section of the aforesaid inner space into a front part and a second part.

The body portion 131 has a front end, to which the center plate 18 is connected to cover the front opening 130a (see FIGS. 2 and 9), and a rear end, to which a rear plate 19 is connected to seal the rear opening 130b in a liquid tight manner (see FIG. 2).

Specifically, the transmission case 130 provides a front chamber 130F between the first intermediate wall 131c and the center plate 18, an intermediate chamber 130M between the first intermediate wall 131c and the second intermediate wall 131d, and a rear chamber 130R between the second intermediate wall 131d and the rear plate 19. An upper opening 130c is formed in an upper part of the body portion 131 (see FIG. 2), and sealed by a hydraulic lift case 20 (see FIG. 1).

The sub-speed change unit 40 is accommodated in the front chamber 130F of the transmission case 130. Specifically, as best illustrated in FIG. 9, the sub-speed change unit 40 includes a driving shaft 401 operatively connected to the propeller shaft 220, a speed change shaft 403 located parallel to the driving shaft 401, a speed change device 420 for stepwisely changing the speed between the driving shaft 401 and the speed change shaft 403, a speed change operation device 470 for operating the speed change device 420.

The driving shaft 401 has a front end supported by the center plate 18 and a rear end supported by the first intermediate wall 131c. The driving shaft 401 is connected to a connecting shaft 402 which is connected to the propeller shaft 220 in such a manner as to be non-rotatably around its axis, via a suitable power transmitting mechanism.

The speed change shaft 403 has a front end supported by the center plate 18 and a rear end supported by the first intermediate wall 131c. The front end of the speed change shaft 403 extends forward through the center plate 18 to have a front extension that forms a drive power output member for outputting drive power to a sub axle 240 (a front axle in this embodiment). The rear end of the speed change shaft 403 extends rearward through the first intermediate wall 131c into the intermediate chamber 130M to have a rear extension operatively connected to the differential gear unit 50.

In this embodiment, as the speed change device 420, a mesh device that enables power transmission at three speed stages is employed. Specifically, as best illustrated in FIG. 9, the mesh device 420 includes a low-speed drive gear 421L, a medium-speed drive gear 421M and a high-speed drive gear 421H relatively non-rotatably supported on the drive shaft 402, a low-speed driven gear 422L, a medium-speed driven gear 422M and a high-speed driven gear 422H relatively rotatably supported on the speed change shaft 403 and held respectively in meshed engagement with the low-speed drive gear 421L, the medium-speed drive gear 421M and the high-speed drive gear 421H, a first clutch hub 423 located between the low-speed driven gear 422L and the medium-speed driven gear 422M and relatively non-rotatably supported on the speed change shaft 403, a first sleeve 424 being capable of taking a low-speed position enabling the low-speed driven gear 422L to be connected to the first clutch hub 423, a medium-speed position enabling the medium-speed driven gear 422M to be connected to the first clutch hub 423 and a neutral position enabling the low-speed driven gear 422L and the medium-speed driven gear 422M to be disconnected from the first clutch hub 423, a second clutch hub 425 relatively non-rotatably supported on the speed change shaft 403 at a position adjacent to the high-speed driven gear 422H, and a second sleeve 426 being capable of taking a high-speed position enabling the high-speed driven gear 422H to be connected to the second clutch hub 425 and a neutral position enabling the high-speed driven gear 422H to be disconnected from the second clutch hub 425.

According to the thus arranged mesh device 420, the first or second sleeve 424, 426 is shifted so as to enable the low-speed, medium-speed or high-speed driven gear 422L, 422M, 422H to be selectively connected to the first or second clutch hub 423, 425, so that the speed change shaft 403 can be rotated at low speed, medium speed or high speed.

Figure 11:
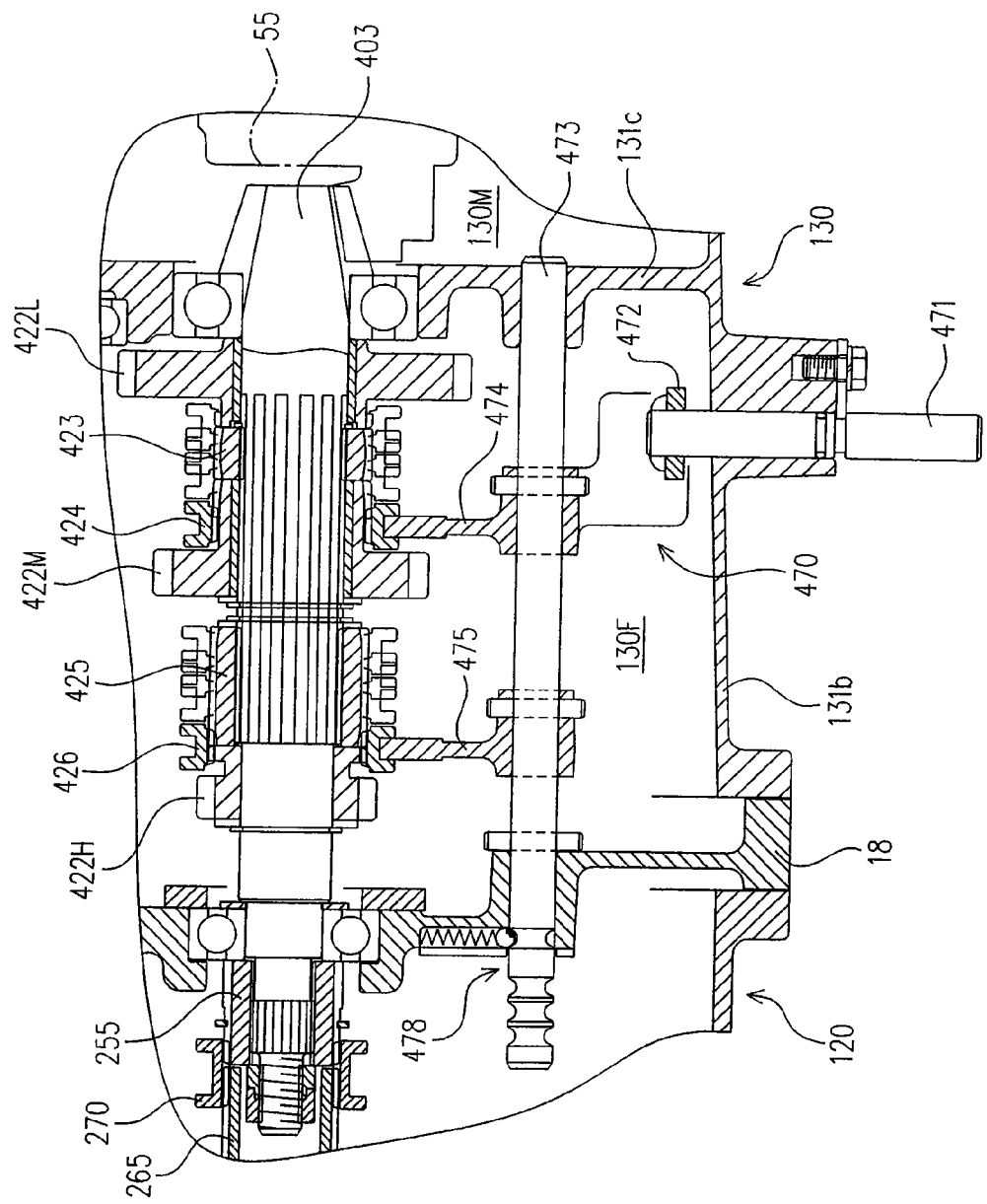
FIG. 11 is a cross sectional view taken along a line XI-XI in FIG. 10.

FIG. 11 is a cross sectional view taken along a line XI-XI in FIG. 10.

Now, the description will be made for the speed change operation device 470. As illustrated in FIGS. 9-11, the sub-speed change operation device 470 includes a speed change operation shaft 471 axially rotatably supported by the pair of lateral walls 131b of the transmission case 130 so as to extend in the vehicle width direction within the front chamber 130F of the transmission case 130, a speed change operation arm 472 having a proximal end relatively non-rotatably supported on the speed change operation shaft 471 so as to be located within the front chamber 130F, a fork shaft 473 axially slidably supported by the center plate 18 and the first intermediate wall 131c so as to extend along the vehicle longitudinal axis within the front chamber 130F, first and second forks 474, 475 axially non-slidably supported on the fork shaft 473, in which any one of the proximal ends of the first and second forks 474, 475 is connected to a free end of the speed change operation arm 472 (in this embodiment, the proximal end of the first fork 474 is connected to the free end of the speed change operation arm 472), and free ends of the first and second forks 474, 475 are respectively engaged with the first and second sleeves 424, 426, and a speed change connection arm 476 for operation of the speed change control shaft 471 from the outside (see FIG. 1).

The thus arranged speed change operation device 470 is capable of bringing the speed change device 420 into a low-speed state, a neutral state, a medium-speed state and a high-speed state by rotating the speed change operation shaft 471 around the axis, on the basis of operation from the outside by a speed change operation member 3 such as a sub-speed change lever disposed around the driver seat. Preferably, the fork shaft 473 may be provided with a detent mechanism 478 for preventing unintentional axial movement of the fork shaft 473 (see FIG. 11).

Figure 12:
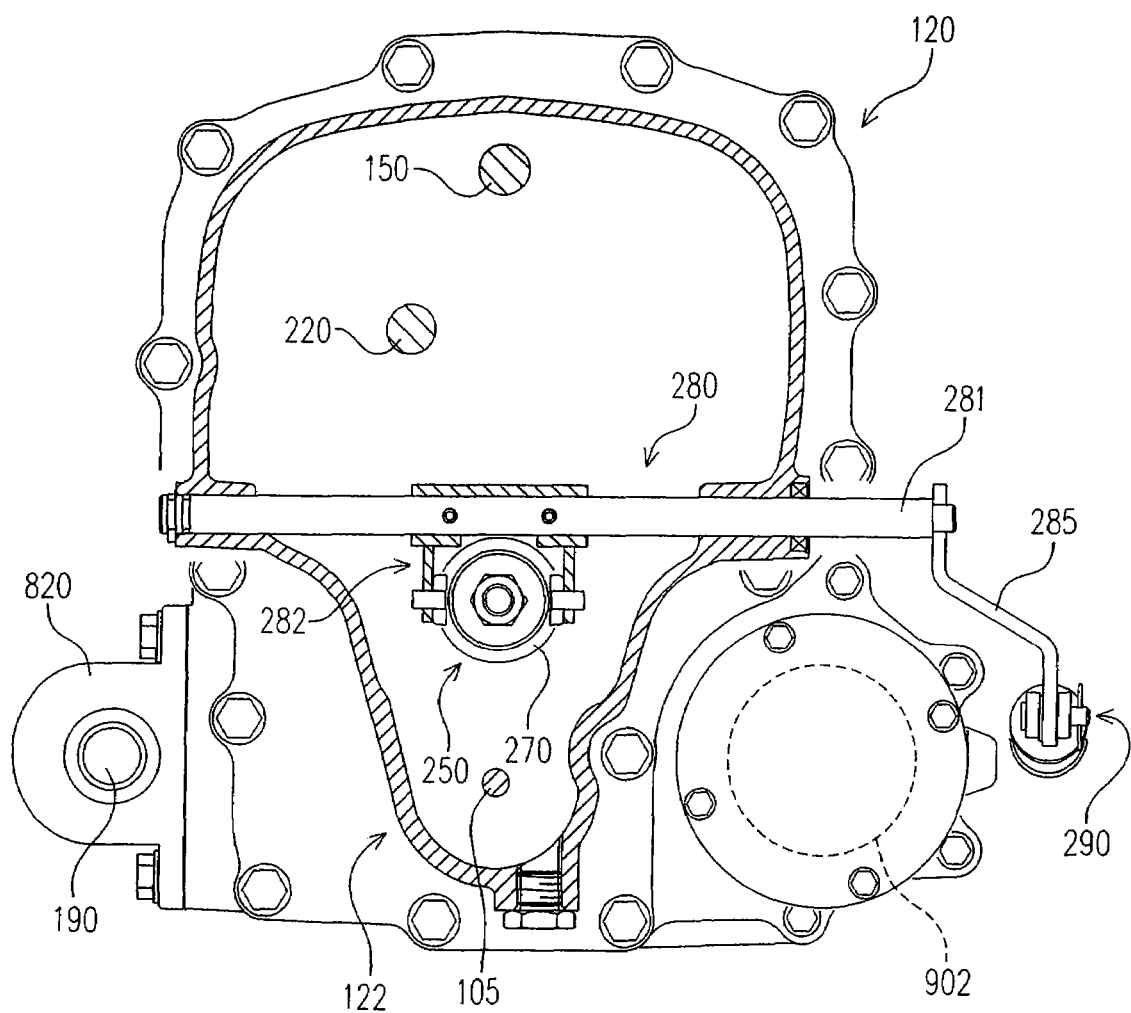
FIG. 12 is a cross sectional view taken along a line XII-XII in FIG. 9.
Figure 13:
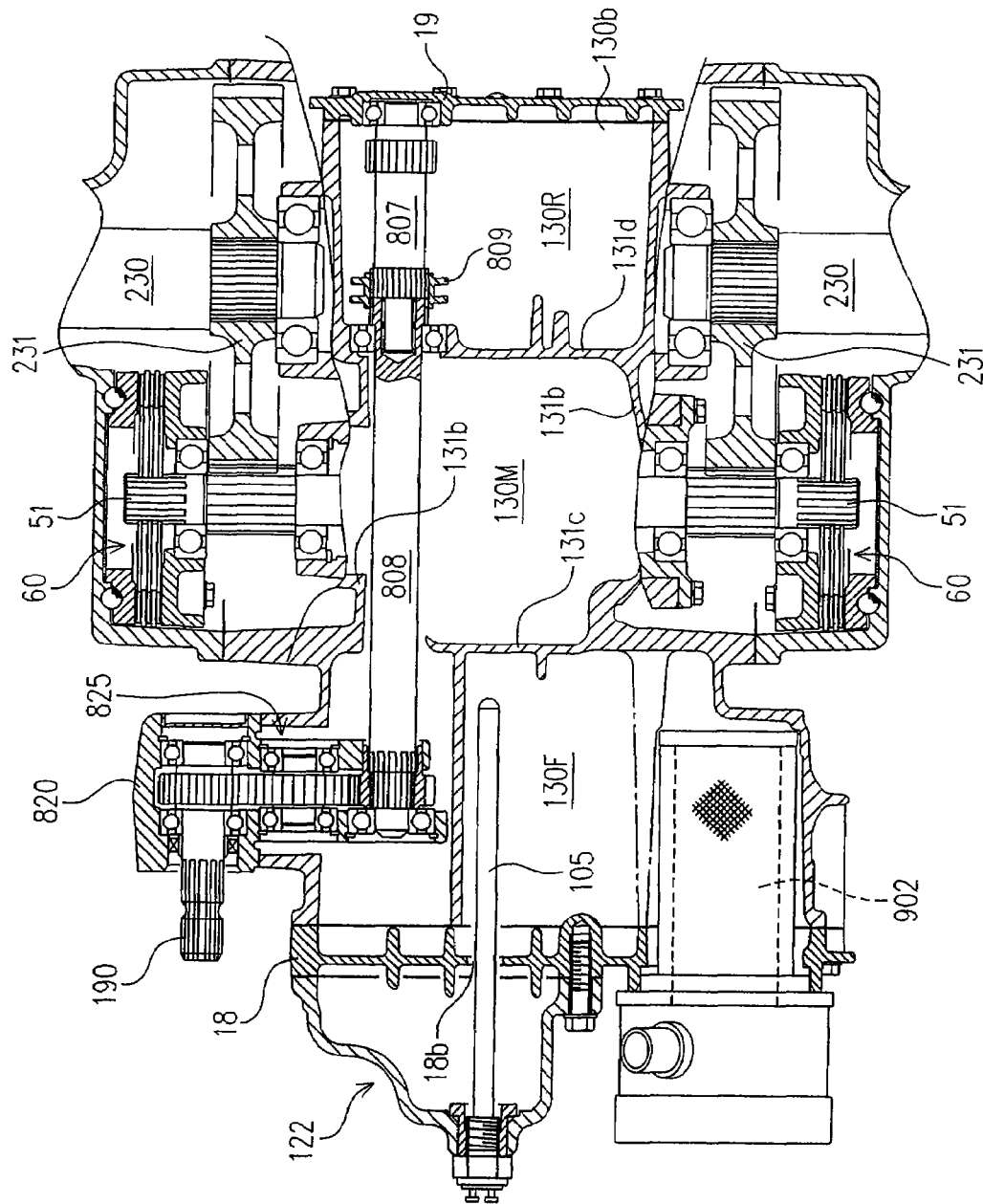
FIG. 13 is a development plan view of the transmission case in lateral cross section.

FIG. 12 is a cross sectional view taken along a line XII-XII in FIG. 9. FIG. 13 is a development plan view of the transmission case in lateral cross section. As illustrated in FIG. 2, the differential gear unit 50 is accommodated in the intermediate chamber 130M of the transmission case 130.

More specifically, the differential gear unit 50 includes a pair of differential yoke shafts 51 (see FIG. 13) supported by the lateral walls 131b to respectively have inner ends located inward of the intermediate chamber 130M and outer ends located outward of the intermediate chamber 130M, a pair of side bevel gears (not shown) relatively non-rotatably supported on the inner ends of the pair of differential yoke shafts 51, a bevel gear (not shown) that is held in meshed engagement with the pair of side bevel gears and travels around the pair of differential yoke shafts 51 while being rotated around a pivotal shaft orthogonal to the pair of differential yoke shafts 51, and a ring gear 55 (see FIG. 9) connected to the pivotal shaft so as to keep the traveling of the bevel gear while permitting the rotation of the same.

The differential gear unit 50 is capable of transmitting drive power, which has been input from the rear end of the speed change shaft 403 to the ring gear 55, to the pair of differential yoke shafts 51 (see FIGS. 9 and 13). As seen in FIG. 13, the pair of differential yoke shafts 51 are respectively and operatively connected to a pair of main-drive axles 230 (a pair of rear axles in this embodiment) supported on the pair of lateral walls of the transmission case via a transmission gear 231.

The reference code 60 in FIG. 13 is a brake mechanism 60 placed in the running-power transmission mechanism. The brake mechanism 60 is designed to be capable of directly or indirectly, and independently or dependently applying braking power to the pair of main-drive axles 230, to which drive power is transmitted from the power source, according to the selected operation from the outside.

In this embodiment, the running-power transmission mechanism is further provided with a sub-axle power take-off unit 250 for outputting drive power to the sub axle 240 (the front axle in this embodiment).

As illustrated in FIG. 9, the sub-axle power take-off unit 250 includes a drive-side member 255 that is relatively non-rotatably mounted on the front end of the speed change shaft 403 and has a spline on the outer circumference, a sub-axle drive shaft 260 (see FIG. 2) supported by the intermediate housing 120 so as to be coaxially aligned with the speed change shaft 403, a driven-side member 265 that is relatively non-rotatably supported on the sub-axle drive shaft 260 so as to be located opposite to the drive-side member 255 and has a spline on the outer circumference, a sleeve 270 that is mounted on the drive-side member 255 and the driven-side member 265 and capable of taking an engaging position enabling connection between both the members 255, 265 in a relatively non-rotatable manner and a shutdown position enabling shutdown of power transmission from the drive-side member 255 to the driven-side member 265, and an operation mechanism 280 for operation of the sleeve 270.

As illustrated in FIG. 12, the operation mechanism 280 includes a sub-axle operation shaft 281 relatively rotatably supported by the intermediate housing 120 so as to extend in the vehicle width direction, and a fork member 282 that has a proximal end relatively non-rotatably supported on the sub-axle operation shaft 281 and a distal end arranged to be engaged with the sleeve 270.

The sub-axle operation shaft 281 is located to have at least one end protruding outward to have an outer extension, through which the sub-axle operation shaft 281 is rotated around the axis on the basis of the operation from the outside. In this embodiment, as illustrated in FIGS. 1 and 12, a proximal end of a sub-axle drive crank arm 285 is relatively non-rotatably connected to the outer extension of the sub-axle operation shaft 281. The sub-axle drive crank arm 285 has a free end connected to a free end of a hydraulic piston 291, a proximal end of the hydraulic piston 291 being placed in a hydraulic cylinder 290 for switching of the sub-axle drive.

With the above arrangement, the reciprocal motion of the hydraulic piston 291 relative to the hydraulic cylinder 290 causes the rotation of the sub-axle operation shaft 281 around the axis, and hence enables the sleeve 270 to be positioned at an engaging position or release position.

Now, the description will be made for the PTO transmission mechanism.

As illustrated such as in FIGS. 2-4, and 9, the PTO transmission mechanism includes the pump shaft 200 operatively connected to the engine 10 via the flywheel 15, the main shaft 150 connected to a downstream end of the pump shaft 200 in the power transmission direction in such a manner as to be relatively non-rotatable around the axis, a PTO drive shaft 160 connected to a downstream end of the main shaft 150 in the power transmission direction in such a manner as to be relatively non-rotatable around the axis, a PTO driven shaft 170 located downstream of the PTO drive shaft 160 in the power transmission direction, a main-PTO clutch unit 70 for selectively performing power-transmission/power-shutoff from the PTO drive shaft 160 to the PTO driven shaft 170, a rear PTO shaft 180 relatively rotatably supported by the second intermediate wall 131d and the rear plate 19 so as to have a first end outwardly extending, a mid PTO shaft 190 supported to have a first end outwardly extending, and a PTO switch unit 80 for selectively performing power-transmission/power-shutoff from the PTO driven shaft 170 to the rear PTO shaft 180 and/or the mid PTO shaft 190.

The main shaft 150 extends into the intermediate housing 120 along the vehicle longitudinal axis, as illustrated in FIG. 2. Preferably, the bearing wall 123 of the intermediate housing 120 has a bearing hole for bearing-support of the main shaft 150, which enables secure support of the main shaft 150.

The PTO drive shaft 160 is rotatably supported by the center plate 18 and the first intermediate wall 131c, as illustrated in FIGS. 2 and 9. The PTO driven shaft 170 is rotatably supported by the second intermediate wall 131d and the rear plate 19 so as to be coaxially aligned with the PTO drive shaft 160.

Figure 14:
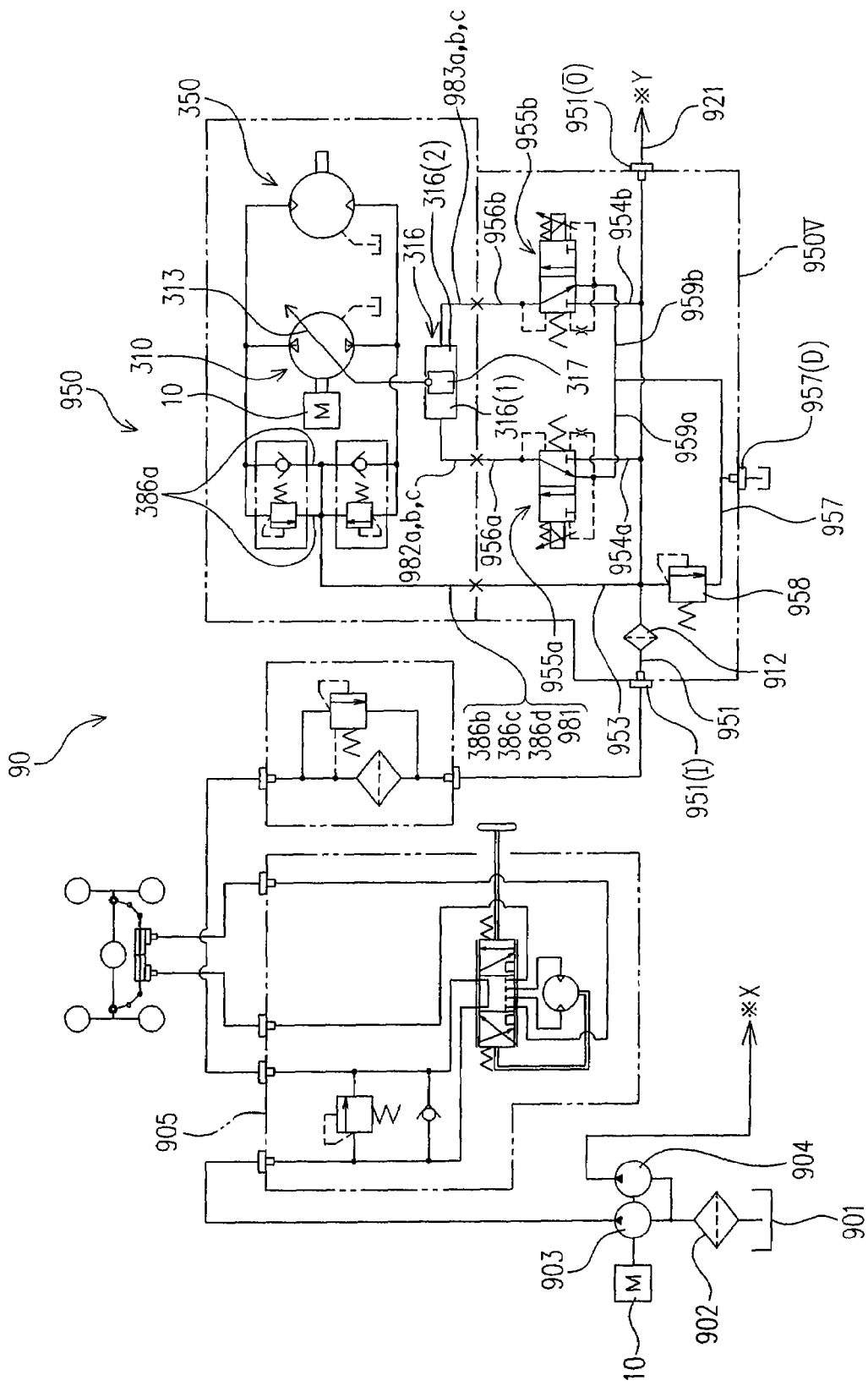
FIG. 14 is a hydraulic circuit diagram in one part of the vehicle of FIG. 1.
Figure 15:
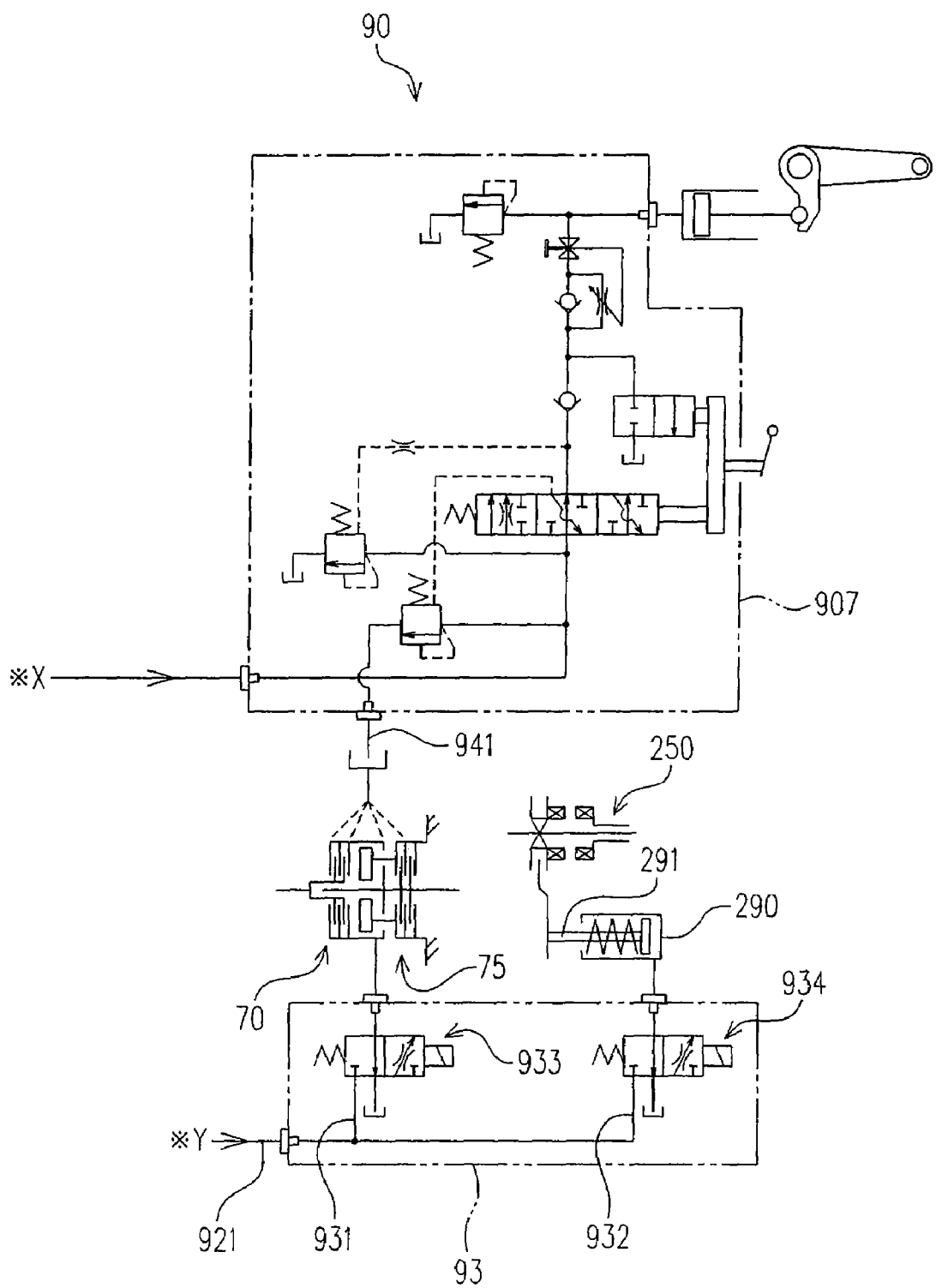
FIG. 15 is a hydraulic circuit diagram in another part of the vehicle of FIG. 1.

FIGS. 14 and 15 are respectively circuit diagrams in one part and another part of the vehicle 1, to which the frame structure 100 of this embodiment has been applied.

The PTO clutch unit 70 is designed to perform power-transmission from the PTO drive shaft 160 to the PTO driven shaft 170 with bringing friction plates into frictional engagement with each other by the hydraulic effect (see FIG. 15).

In this embodiment, the PTO transmission mechanism further includes a PTO brake unit 75 operable in association with the PTO clutch unit 70. The PTO brake unit 75 is designed not to apply brake power against the PTO driven shaft 170 when the PTO clutch unit 70 is in a power-transmitting state in which the PTO clutch unit 70 transmits drive power from the PTO drive shaft 160 to the PTO driven shaft 170, and to apply brake power against the PTO driven shaft 170 when the PTO clutch unit 70 is in a power-shutoff state in which the PTO clutch unit 70 shutoff drive power from the PTO drive shaft 160 to the PTO driven shaft 170.

As best illustrated in FIG. 9, in this embodiment, the PTO switch unit 80 includes a first transmission gear member 801 mounted on a portion of the PTO driven shaft 170 located within the rear chamber 130R, a second gear member 802 relatively rotatably supported on the rear PTO shaft 180 in meshed engagement with the first transmission gear member 801, a rear PTO sleeve 803 that is axially movable and relatively non-rotatable to the rear PTO shaft 180 and is capable of taking an engaging position enabling meshed engagement with internal threads formed on the second gear member 802 and a release position releasing itself from meshed engagement with the internal threads, a third gear member 804 held in meshed engagement with the second gear member 802, a first intermediate shaft 805 that relatively non-rotatably supports the third gear member 804, a fourth gear member 806 held in meshed engagement with the third gear member 804, a second intermediate shaft 807 that is rotatably supported by the second intermediate wall 131d and the rear plate 19 and relatively non-rotatably supports the fourth gear member 806, a mid PTO transmission shaft 808 located coaxial with the second intermediate shaft 807, a mid PTO sleeve 809 that is axially movably supported by the mid PTO transmission shaft 808 and the second intermediate shaft 807 and is capable of taking an engaging position enabling connection of both the shafts 808, 807 together in a relatively axially non-rotatable manner and a release position enabling both the shafts 808, 807 to be relatively axially movable to each other, a mid PTO case 820 (see FIG. 10) that is separably connected to the transmission case 130 and supports the mid PTO shaft 190, and a gear train 825 (see FIG. 13) that connects the mid PTO transmission shaft 808 and the mid PTO shaft 190 together and is supported by the mid PTO case 820. The rear PTO sleeve 803 and the mid PTO sleeve 809 are operated by a suitable operation mechanism (not shown).

As illustrated in FIG. 1, the vehicle of this embodiment is equipped with a mower device 9 under the frame structure 100 to be operatively driven by the mid PTO shaft 190.

More preferably, the PTO switch unit 80 is provided with a PTO output detection mechanism 88 for detecting the output status of each of the rear PTO shaft 180 and the mid PTO shaft 190. The PTO output detection mechanism 88 has first and second switches 881, 882 to be turned on and off according to the axial position of a PTO fork shaft.

Now, the description will be made for a hydraulic mechanism 90 of the vehicle in this embodiment. The hydraulic mechanism 90 includes a tank 901 for storing hydraulic fluid, and first and second hydraulic pumps 903, 904 for respectively sucking stored hydraulic fluid from the tank 901 through a filter 902.

In this embodiment, at least a portion of the inner space of the frame structure 100 is used as the tank 901. That is, the flywheel housing 110, the intermediate housing 120 and the transmission case 130 form accommodating spaces for various transmission mechanisms, as well as constituting a portion of the chassis, in which at least a portion of the inner space forms a hydraulic fluid reservoir space.

Now, the description will be made in detail for the hydraulic fluid reservoir space of the frame structure 100. As described above, the frame structure 100 is designed so that the inner spaces of the intermediate housing 120 is utilized as a fluid chamber, and the flywheel accommodating space (a space other than the space occupied by the HST unit 30) of the flywheel housing 110 is utilized as a dry chamber.

In addition to the above arrangement, as illustrated in FIG. 9, the center plate 18, which is interposed between the intermediate housing 120 and the transmission case 130, has fluid communication ports 18a on its lower side. The rear opening of the transmission case 130 is sealed by the rear plate 19 in a liquid tight manner, as described above. With this arrangement, the frame structure 100 of this embodiment makes it possible to utilize the inner spaces of the intermediate housing 120 and the transmission case 130 as the fluid reservoir space.

Further, the frame structure 100 is designed to make it possible to get hydraulic fluid out of the fluid reservoir space via the filter 902.

Specifically, the frame structure 100 has a partition wall 101. The partition wall 101 is designed to divide the fluid reservoir space into a filter accommodating portion 100a for accommodating the filter 902 and a main portion 100b other than the filter accommodating portion 100a.

In this embodiment, as illustrated in FIG. 10, the partition wall 101 is provided on the transmission case 130. Specifically, the transmission case 130 has a bulge 135 that extends in the vehicle width direction over a region of the transmission case 130 from the front end, which end facing the rear end of the intermediate housing 120 through the center plate 18, rearward to a portion with a predetermined distance. The bulge 135 forms the filter accommodating portion 100a.

In the transmission case 130, the partition wall 101 extends from the inner surface of one of the pair of lateral walls 131b, on which the bulge 135 is formed, towards the lateral center of the transmission case 130. The inner space of the bulge 135 is divided from the other portion by the partition wall 101.

More specifically, the partition wall 101 has a communication port 102 for communication between the filter accommodating portion 100a and the main portion 100b in a lower region of the fluid reservoir space. That is, the partition wall 101 divides the filter accommodating portion 100a from the main portion 100b in such a manner as to allow fluid communication only in the lower region.

The frame structure of this embodiment is capable of securely getting hydraulic fluid out of the fluid reservoir space without fluid running-out, while keeping the amount of hydraulic fluid stored therein as low as possible without increasing a height from ground.

That is, the fluid stored in the fluid reservoir space causes a drag resistance in various transmission mechanisms placed inside of the frame structure 100. Accordingly, it is preferable to reduce the amount of fluid stored in the fluid reservoir space in light of the power transmission efficiency. On the other hand, excessive reduction of hydraulic fluid in the fluid reservoir space may cause fluid running-out during the fluid is drawn out. Particularly, when the vehicle tilts due to such as running up or down a slope, the surface level of store fluid is changed. As a result, air may be drawn into a hydraulic circuit.

The frame structure 100 of this embodiment is designed so that the partition wall 101 allows the filter accommodating portion 100a to be communicated with the main portion only in the lower region of the fluid reservoir space. With this arrangement, it is possible to keep variation in the surface level of hydraulic fluid in the filter accommodating portion 100a, which is caused by variation in vehicle's posture or the like, as low as possible. Accordingly, the amount of hydraulic fluid in the fluid reservoir space can be limited, thereby preventing deterioration in power transmission efficiency, while effectively preventing running-out of hydraulic fluid sucked through the filter 902.

Preferably, the partition wall 101 is located to have the communication port 102 positioned substantially at the vehicle lateral center. With this arrangement, it is possible to limit variation in surface level of hydraulic fluid in the filter accommodating portion 100a when the vehicle has tilted rightward or leftward. In this embodiment, as illustrated in FIG. 10, the partition wall 101 has a horizontal portion 101a extending substantially horizontally from the lateral wall 131b of the transmission case 130 substantially to the lateral center of the frame structure 100, and a vertical portion 101b extending from a free end of the horizontal portion 101a substantially downward, in which the communication port 102 defined by a free end of the vertical portion 101b and an inner surface of the bottom wall 131a of the transmission case 130 is positioned substantially at the vehicle lateral center.

More preferably, the partition wall 101 is located to have the communication port 102 positioned substantially at the center of the fluid reservoir space with respect to the vehicle longitudinal direction. With this arrangement, it is possible to effectively limit variation in surface level of hydraulic fluid within the filter accommodating portion 101a when the vehicle has tilted forward or rearward. In this embodiment, as described above, the inner spaces of the intermediate housing 120 and the transmission case 130 together form a fluid reservoir space. Therefore, the partition wall 101 is formed near the front end of the transmission case 130.

More preferably, as illustrated in FIGS. 9 and 10, an oil heater 105 is provided near the communication port 102 so as to effectively prevent deterioration in viscosity of hydraulic fluid during cold season. That is, hydraulic fluid sucked through the filter 902 is drawn into the filter accommodating portion 100a through the communication port 102 from the main portion 100b. Thus, the oil heater 105 provided near the communication hole 102 can efficiently heat hydraulic fluid when it is drawn out of the fluid reservoir space for use.

In this embodiment, as illustrated in such as FIG. 9, a downward bulge 122 is formed near the rear end of the intermediate housing 120 and the oil heater 105 is introduced through the front side of the downward bulge 122 and detachably installed in place. A reference code 18b in FIG. 9 represents a passing hole formed in the center plate 18, through which the oil heater passes.

In this embodiment, the frame structure 100 is made up of three units, namely the flywheel housing 110, the intermediate housing 120 and the transmission case 130. In this regard, it is to be noted that the effect produced by providing the partition wall 101 is not limited to the arrangement of this embodiment. That is, it is possible to apply the partition wall 101 to a frame structure made up of a single unit, two units or the like, as far as such unit(s) are arranged from one side to another side along the vehicle longitudinal axis and can utilize at least a portion of the inner space defined by the unit(s) as a hydraulic fluid reservoir space.

The hydraulic mechanism 90 further includes a hydraulic control mechanism 905 for controlling the HST unit 30 (see FIG. 14), to which hydraulic fluid sucked from the fluid reservoir space through the filter 902 by the first hydraulic pump 903 is supplied. In this embodiment, a power-steering hydraulic circuit 905 is interposed between the first hydraulic pump 903 and the hydraulic control mechanism 950 so as to utilize pressurized fluid from the first hydraulic pump as power steering hydraulic fluid.

In this embodiment, the hydraulic control mechanism 950 has a hydraulic control valve 950V which is connected to a side wall of the intermediate housing 120, as illustrated in FIGS. 4 and 7.

The hydraulic control valve 950V has a main line 951 which has a first end and a second end forming an inlet port 951(I) and an outlet port 951(O) respectively, a line filter 912 disposed in the main line 951, a charge oil supply line 953 which has a first end communicated with the main line 951 at a second side of the line filer 912, a first supply line 954a and a second supply line 954b, a relief line 957 which has a first end communicated with the main line 951 and a second end opening to the inner space of the intermediate housing 120 so as to form a drain port 957(D), a relief valve 958 which is disposed in the relief line 957 so as to set a pressure of the main line 951 to the predetermined pressure, first and second switch valves 955a and 955b which have first side communicated with second ends of the first and second supply lines 954a and 954b respectively, first and second supplying/discharging lines 956a and 956b which have first ends communicated with the second sides of the first and second switch valves 955a and 955b respectively, and first and second discharge lines 959a and 959b which have first ends communicated with the first side of the first and second switch valves 955a and 955b respectively and second ends communicated with the drain port 957(D).

As illustrated in FIGS. 4, 5, 7 and 8, the second end of the charge oil supply line 953 is in communication with a charge line 386 formed in the center section 380 through an appropriate oil conduit (oil passage 981 formed in the intermediate housing 120 in this embodiment) provided in the intermediate housing.

More specifically, as illustrated in FIG. 8, the charge line 386 of the center section 380 includes a bypass line 386a which brings the pair of oil passages 386 into communication with each other, a first charge line 386b whose first end is in communication with the bypass line 386a and whose second end is opened from an outer surface of the center section 380, a second charge line 386c whose first end is in communication with the oil passage 981 and whose second end is opened from the outer surface of the center section 380, and a charge conduit 386d which bring the second ends of the first charge line 386b and the second charge line 386c into communication with each other.

On the other hand, the second ends of the first supplying/discharging line 956a and second supply line 956b are brought into communication with the hydraulic operation device 315 through appropriate oil conduits. The hydraulic operation device 315 controls the slanting position of the output adjusting member 313. Now, the description will be made for the hydraulic operation device 315.

As illustrated in FIGS. 4 and 6, the hydraulic operation device 315 includes a hydraulic cylinder 316, and a hydraulic piston 317 which is slidably accommodated in the hydraulic cylinder 316 such that the inner space of the hydraulic cylinder 316 can be liquid-tightly separated into a first hydraulic chamber 316(1) and a second hydraulic chamber 316(2). The hydraulic operation device 315 also includes a connecting member 318 which connects the hydraulic piston 317 and the output adjusting member 313 such that the output adjusting member 313 can slant in response to the sliding operation of the hydraulic piston 317.

In this embodiment, the hydraulic cylinder 316 comprises a through hole 316a formed in the pump case 301 and a pair of lid members 316b which close both end openings of the through hole 316a.

The first supplying/discharging line 956a is in communication with the first chamber 316(1) of the hydraulic cylinder 316 through an appropriate oil conduit.

In this embodiment, the first supplying/discharging line 956a is in communication with the first chamber 316(1) through a first conduit 982a, a communication passage 982b and a second conduit 982c. The first conduit 982a is disposed within the intermediate housing 120 so as to have a first end communicated with the first supplying/discharging line 956a and a second end opened from the support surface 125b of the intermediate housing 120. The communication passage 982b is formed in the center section 380 so as to have a first end which is opened from its surface opposed to the support surface 125b to communicate with the first conduit 982a, and a second end which is opened from its surface opposite from the opposed surface. The second conduit 982c is disposed in the flywheel housing 110 so as to have a first end communicated with the second end of the communication passage 982b and a second end communicated with the first chamber 316(1).

Similarly, the second supplying/discharging line 956b is in communication with the second chamber 316(2) of the hydraulic cylinder 316 through an appropriate oil conduit.

In this embodiment, the second supplying/discharging line 956b is in communication with the second chamber 316(2) through a first conduit 983a, a communication passage 983b and a second conduit 983c. The first conduit 983a is disposed within the intermediate housing 120 so as to have a first end communicated with the second supplying/discharging line 956b and a second end opened from the support surface 125b of the intermediate housing 120. The communication passage 983b is formed in the center section 380 so as to have a first end which is opened from its surface opposed to the support surface 125b to communicate with the first conduit 983a, and a second end which is opened from its surface opposite from the opposed surface. The second conduit 983c is disposed in the flywheel housing 110 so as to have a first end communicated with the second end of the communication passage 983b, and a second end communicated with the second chamber 316(2).

In this embodiment, the first and second switch valves 955a and 955b which control the supply and discharge operations of hydraulic oil to and from the hydraulic operation device 315 are provided in the HST hydraulic control valve 950V mounted on an outer wall surface (outer wall surface of the intermediate housing 120 in this embodiment) of the frame structure 100.

Therefore, control signal wires for the first and second switch valves 955a and 955b need not be routed into the frame structure, and it is possible to simplify the wiring structure between the first and second switch valves 955a, 955b and the HST operating member 2 (see FIG. 1) disposed in the vicinity of the driver's seat, and it is possible to facilitate the piping operation and maintenance operation.

As illustrated in FIG. 15, the outlet port 951(O) of the main line 951 is in communication with the PTO valve 93 (see FIG. 1). The PTO valve 93 controls the supply and discharge operation of hydraulic oil to and from the PTO clutch unit 70 and the PTO brake unit 75 through a conduit 921. The PTO valve 93 also controls the supply and discharge operation of hydraulic oil to and from the auxiliary axle driving switch hydraulic cylinder 290.

The PTO valve 93 includes a PTO clutch line 931 and a switch line 932 for the auxiliary driving axle which are in communication with the conduit 921, and solenoid valves 933 and 934 inserted into the lines 931 and 932, respectively.

The hydraulic mechanism 90 includes a hydraulic oil supply valve 907 for a hydraulic lift, to which hydraulic oil is supplied from the second hydraulic pump 904 (see FIG. 15).

The hydraulic mechanism 90 also includes a PTO lubricating line 941. The PTO lubricating line 941 supplies relief oil from the hydraulic lift hydraulic oil supply valve 907 to the PTO clutch unit 70 and the PTO brake unit 75 as lubricant oil.

As illustrated in FIG. 9, the PTO lubricating line 941 is in communication with a lubricating oil path formed in the PTO driving shaft 160 through an oil path 942 formed in a first intermediate wall 131c of the transmission case 130.

In this embodiment, two hydraulic pumps (the first and second hydraulic pumps 903, 904) are provided in order to address excessive load applied to a single hydraulic pump. That is, the number of hydraulic pumps are properly set according to the installed hydraulic circuits. It is a matter of course that various hydraulic circuits provided in this embodiment are properly subjected to omission, modification or addition according to the specification of a vehicle.

This specification is by no means intended to restrict the present invention to the preferred embodiments set forth therein. Various modifications to the frame structure, as well as the brake mechanism as described herein, may be made by those skilled in the art without departing from the spirit and scope of the present invention as defined in the appended claims.

What is claimed is:

1. A frame structure of a vehicle comprising a flywheel housing, an intermediate housing and a transmission case that are connected to each other along a longitudinal axis of the vehicle to constitute a vehicle frame with an inner space for accommodating a running-power transmission path for transmitting power from an engine to sub drive wheels and main drive wheels respectively located closer to a first end and a second end along the longitudinal axis of the vehicle via a HST unit: wherein the flywheel housing has a first end and a second end along the longitudinal axis of the vehicle, the first end being connected to the engine, the second end being provided with an opening;

the intermediate housing is a hollow shape having a first end and a second end along the longitudinal axis of the vehicle, the first end of the intermediate housing being provided with an abutting surface located opposite to the second end of the flywheel housing, a support surface located radially inward of the abutting surface so as to support the HST unit and a first-end opening located radially inward of the support surface, the second end of the intermediate housing being provided with a second-end opening, the abutting surface and the support surface being located in the longitudinal axis of the vehicle so that at least a portion of the HST unit is accommodated within the flywheel housing;

a sub-axle drive shaft for transmitting driving power toward the sub drive wheels is disposed at lower portions within the flywheel housing and the intermediate housing so as to extend along the longitudinal axis of the vehicle;

the HST unit includes a pump shaft operatively connected to the engine, a hydraulic pump unit driven by the pump shaft, a hydraulic motor unit that non-stepwisely changes a driving force from the engine in cooperation with the hydraulic pump unit, a motor shaft rotated by the hydraulic motor unit, and a center section forming a hydraulic circuit for fluidly communicating the hydraulic pump unit and the hydraulic motor unit;

the center section has a first side in the longitudinal axis of the vehicle forming a pump support surface which supports the hydraulic pump unit, and a second side in the longitudinal axis of the vehicle forming a motor support surface which supports the hydraulic motor unit;

the pump shaft is disposed upwardly than the motor shaft, and extends along the longitudinal axis of the vehicle such that its first end extends within the flywheel housing so as to be operatively connected to the engine and its second end extends toward the second end of the vehicle through the center section; and the motor shaft extends along the longitudinal axis of the vehicle within the intermediate housing such that its second end extends toward the second end of the vehicle, and is displaced to one side in the vehicle width direction from a line connecting the sub-axle drive shaft and the pump shaft.

2. A frame structure of a vehicle according to claim 1, wherein:

the intermediate housing has a hollow body portion and a flange portion located closer to a first end along the longitudinal axis of the hollow body portion, the flange portion forming the first-end opening at a radially center;

the flange portion has the abutting surface and the support surface located radially inward of the abutting surface so as to support the center section of the HST unit;

the center section is connected with the support surface of the flange portion so as to seal an inner space of the flywheel housing against an inner space of the intermediate housing in a liquid tight manner, while the sub-axle drive shaft is extends from the inner space of the intermediate housing into the inner space of the flywheel housing through a portion between the abutting surface and the support surface in a radial direction in a liquid tight manner.

3. A frame structure of a vehicle comprising a flywheel housing, an intermediate housing and a transmission case that are connected to each other along a longitudinal axis of the vehicle to constitute a vehicle frame with an inner space for accommodating a running-power transmission path for transmitting power from an engine to drive wheels via a HST unit: wherein the flywheel housing has a first end and a second end along the longitudinal axis of the vehicle, the first end being connected to the engine, the second end being provided with an opening;

the intermediate housing is a hollow shape having a first end and a second end along the longitudinal axis of the vehicle, the first end of the intermediate housing being provided with an abutting surface located opposite to the second end of the flywheel housing, a support surface located radially inward of the abutting surface so as to support the HST unit and a first-end opening located radially inward of the support surface, the second end of the intermediate housing being provided with a second-end opening, the abutting surface and the support surface being located in the longitudinal axis of the vehicle so that at least a portion of the HST unit is accommodated within the flywheel housing;

the HST unit includes a pump shaft operatively connected to the engine, a variable displacement type hydraulic pump unit driven by the pump shaft and having a hydraulic operation type output adjusting member, a hydraulic motor unit that non-stepwisely changes a driving force from the engine in cooperation with the hydraulic pump unit, a motor shaft rotated by the hydraulic motor unit, and a center section forming a hydraulic circuit for fluidly communicating the hydraulic pump unit and the hydraulic motor unit;

the center section has a first side in the longitudinal axis of the vehicle forming a pump support surface which supports the hydraulic pump unit, and a second side in the longitudinal axis of the vehicle forming a motor support surface which supports the hydraulic motor unit; and the hydraulic operation type output adjusting member is operated by hydraulic oil of which a switch valve in a valve unit mounted on an outer wall of the intermediate housing controls the supply and discharge, and which flows in hydraulic lines within the intermediate housing and the flywheel housing.

* * * * *